(12) United States Patent
Kono et al.

(10) Patent No.: US 8,012,622 B2
(45) Date of Patent: Sep. 6, 2011

(54) MULTI-LAYER, MICROPOROUS MEMBRANE, BATTERY SEPARATOR AND BATTERY

(75) Inventors: Koichi Kono, Asaka (JP); Kohtaro Kimishima, Yokohama (JP); Hiroyuki Ozaki, Kamishinjo (JP); Patrick Brant, Seabrook, TX (US); Jeffrey L. Brinen, League City, TX (US); Zerong Lin, Kingwood, TX (US)

(73) Assignee: Toray Tonen Specialty Separator Godo Kaisha (JP)

( * ) Notice: Subject to any disclaimer, the term of this patent is extended or adjusted under 35 U.S.C. 154(b) by 524 days.

(21) Appl. No.: 11/940,196

(22) Filed: Nov. 14, 2007

(65) Prior Publication Data

US 2009/0123827 A1    May 14, 2009

(51) Int. Cl.
    *H01M 2/18*    (2006.01)
(52) U.S. Cl. .................................... 429/145
(58) Field of Classification Search ............ 429/144, 429/145; 428/315.5
    See application file for complete search history.

(56) References Cited

U.S. PATENT DOCUMENTS

2009/0274955 A1 * 11/2009 Kikuchi et al. ............. 429/144

FOREIGN PATENT DOCUMENTS

| EP | 0 794 583 | 9/1997 |
|----|-----------|--------|
| EP | 1 905 586 | 4/2008 |
| JP | 7-216118 A | 8/1995 |
| JP | 10-195215 A | 7/1998 |
| JP | 10-279718 A | 10/1998 |
| JP | 2002-128943 | 5/2002 |
| JP | 2002-284918 | 10/2002 |
| JP | 2002-321323 | 11/2002 |
| JP | 2004-196870 | 7/2004 |
| WO | WO 2007/010878 | * 1/2007 |
| WO | WO 2007/015416 | 2/2007 |
| WO | WO 2008/026780 | 3/2008 |

OTHER PUBLICATIONS

Ihm, D. et al., "*Effect of polymer blending and drawing conditions on properties of polyethylene separator prepared for Li-ion secondary battery.*" Journal of Power Sources 2002, vol. 109, pp. 388-393.

* cited by examiner

*Primary Examiner* — Christina Johnson
*Assistant Examiner* — Larry Thrower
(74) *Attorney, Agent, or Firm* — DLA Piper LLP (US)

(57) ABSTRACT

The invention relates to a multi-layer, microporous polyolefin membrane having appropriate permeability, pin puncture strength, shutdown temperature, shutdown speed, meltdown temperature, and thickness uniformity. The invention also relates to a battery separator formed by such multi-layer, microporous membrane, and a battery comprising such a separator. Another aspect of the invention relates to a method for making the multi-layer, microporous polyolefin membrane, a method for making a battery using such a membrane as a separator, and a method for using such a battery.

12 Claims, 2 Drawing Sheets

MULTI-LAYER, MICROPOROUS MEMBRANE, BATTERY SEPARATOR AND BATTERY

FIELD OF THE INVENTION

The invention relates to a multi-layer, microporous polyolefin membrane having appropriate permeability, pin puncture strength, shutdown temperature, shutdown speed, meltdown temperature, and thickness uniformity. The invention also relates to a battery separator formed by such multi-layer, microporous membrane, and a battery comprising such a separator. Another aspect of the invention relates to a method for making the multi-layer, microporous polyolefin membrane, a method for making a battery using such a membrane as a separator, and a method for using such a battery.

BACKGROUND OF THE INVENTION

Microporous polyolefin membranes can be used as battery separators in, e.g., primary and secondary lithium batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' performance significantly affects the properties, productivity and safety of the batteries. Accordingly, the microporous polyolefin membrane should have suitable mechanical properties, heat resistance, permeability, dimensional stability, shutdown properties, meltdown properties, etc. As is known, it is desirable for the batteries to have a relatively low shutdown temperature and a relatively high meltdown temperature for improved battery-safety properties, particularly for batteries that are exposed to high temperatures during manufacturing, charging, re-charging, use, and/or storage. Improving separator permeability generally leads to an improvement in the battery's storage capacity. High shutdown speed is desired for improved battery safety, particularly when the battery is operated under overcharge conditions. Improving pin puncture strength is desired because roughness of the battery's electrode can puncture the separator during manufacturing leading to a short circuit. Improved thickness uniformity is desired because thickness variations lead to manufacturing difficulties when winding the film on a core. Thickness variations can also lead to non-isotropic temperature variations in the battery, which can lead to battery hot-spots (regions of higher temperature) where the separator is relatively thin.

In general, microporous membranes containing polyethylene only (i.e., the membrane consists of, or consists essentially of, polyethylene) have low meltdown temperatures, while microporous membranes containing polypropylene only have high shutdown temperatures. Accordingly, microporous membranes comprising polyethylene and polypropylene as main components have been proposed as improved battery separators. It is therefore desired to provide microporous membranes formed from polyethylene resin and polypropylene resin, and multi-layer, microporous membranes comprising polyethylene and polypropylene.

JP7-216118A, for example, discloses a battery separator having a suitable shutdown temperature and mechanical strength. The patent publication discloses a battery separator comprising a multi-layer, porous film having two microporous layers. Both layers can contain polyethylene and polypropylene, but in different relative amounts. For example, the percentage of the polyethylene is 0 wt. % to 20 wt. % in the first microporous layer, and 21 wt. % to 60 wt. % in the second microporous layer, based on the combined weight of the polyethylene and polypropylene. The total amount of polyethylene in the film (i.e., both microporous layers) is 2 wt. % to 40 wt. %, based on the weight of the multi-layer microporous film.

JP10-195215A discloses a relatively thin battery separator having acceptable shutdown and pin-pulling characteristics. The term "pin pulling" refers to the relative ease of pulling a metal pin from a laminate of a separator, a cathode sheet and an anode sheet, which is wound around the pin, to form a toroidal laminate. The multi-layer, porous film contains polyethylene and polypropylene, but in different relative amounts. The percentage of polyethylene is 0 wt. % to 20 wt. % in the inner layer and 61 wt. % to 100 wt. % in the outer layer, based on the total weight of the polyethylene and polypropylene.

JP10-279718A discloses a separator designed to prevent unacceptably large temperature increases in a lithium battery when the battery is overcharged. The separator is formed from a multi-layer, porous film made of polyethylene and polypropylene, with different relative amounts of polyethylene and polypropylene in each layer. The film has a polyethylene-poor layer whose polyethylene content is 0 wt. % to 20 wt. %, based on the weight of the polyethylene-poor layer. The second layer is a polyethylene-rich layer which contains 0.5 wt. % or more of polyethylene having a melt index of 3 or more and has a polyethylene content of 61 wt. % to 100 wt. %, based on the weight of the polyethylene-rich layer.

It would be desirable to further improve the permeability, pin puncture strength, and shutdown speed of microporous polyolefin membranes. Moreover, it would be desirable to further improve the thickness uniformity of microporous polyolefin membranes in order to reduce the likelihood of short-circuiting when used as battery separators.

SUMMARY OF THE INVENTION

In an embodiment, the invention relates to a multi-layer microporous membrane, comprising:
a first layer material comprising a first polyethylene and a first polypropylene and a second layer material comprising a second polyethylene and a second polypropylene, the second polypropylene having (1) a weight-average molecular weight of $6 \times 10^5$ or more, (2) a heat of fusion of 90 J/g or more, and (3) a fraction having a molecular weight of $5 \times 10^4$ or less with the fraction being 5% or less by mass of the second polypropylene. The multi-layer membrane can comprises e.g., a first microporous layer containing the first microporous layer material and a second microporous layer containing the second microporous layer material. For example, the multi-layer membrane of claim 1 can comprise:

a first microporous layer containing the first microporous layer material, a third microporous layer containing the first microporous layer material, and a second microporous layer containing the second microporous layer material, the second microporous layer being located between the first and third microporous layers.

In an alternative form, the multi-layer microporous membrane can comprise:
a first microporous layer containing the second microporous layer material, a third microporous layer containing the second microporous layer material, and a second microporous layer containing the first microporous layer material, the second microporous layer being located between the first and third microporous layers.

In another embodiment, the invention relates to a method for producing a microporous membrane, comprising, (1) combining a first polyethylene resin, a first polypropylene resin, and a first process solvent to form a first polyolefin solution, wherein the first polyethylene resin and the first polypropylene resin together constitute a first polyolefin composition; and wherein the amount of the first polyethylene resin in the first polyolefin composition is at least about 80 wt. %, based on the weight of the first polyolefin composition; and (2) combining a second polyethylene resin, a second polypropylene resin, and a second process solvent to form a second polyolefin solution, wherein the second polyethylene resin and the second polypropylene resin together constitute a second polyolefin composition; and wherein the amount of the second polyethylene resin in the second polyolefin composition is at least about 50 wt. %, based on the weight of the second polyolefin composition; the second polypropylene resin having (a) a weight-average molecular weight of $6\times10^5$ or more, (b) a heat of fusion of 90 J/g or more, and (c) a fraction having a molecular weight of $5\times10^4$ or less with the fraction being 5% or less by mass of the second polypropylene resin. In an embodiment, the invention further comprises (3) extruding at least a portion of the first polyolefin solution through a die or dies and co-extruding at least a portion of the second polyolefin solution in order to form a multi-layer extrudate, (4) cooling the multi-layer extrudate to form a multi-layer sheet, (5) removing at least a portion of the process solvents from the multi-layer, sheet to form a solvent-removed sheet, and (6) removing at least a portion of any volatile species from the sheet to form the multi-layer, microporous membrane.

In yet another embodiment, the invention relates to a battery comprising an anode, a cathode, and electrolyte, and the multi-layer membrane of the preceding embodiments, wherein the multi-layer membrane separates at least the anode from the cathode. The battery can be used as a source or sink of electric charge.

DETAILED DESCRIPTION OF THE INVENTION

Figure 1:
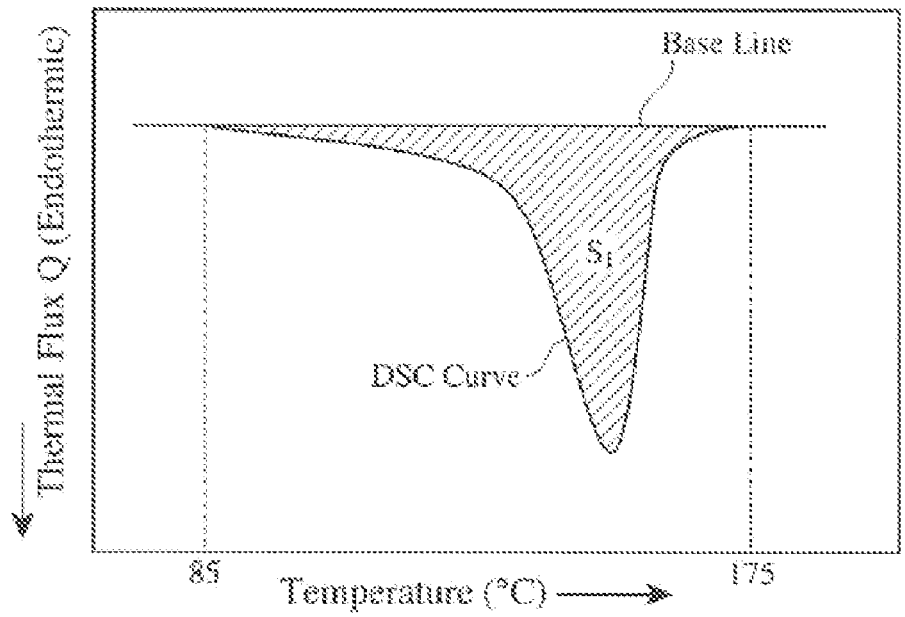
FIG. 1 is a graph showing one example of typical DSC curves.

[1] Composition and Structure of the Multi-Layer, Microporous Polyolefin Membrane In an embodiment, the multi-layer, microporous membrane comprises two layers. The first layer (e.g., the upper layer) comprises a first microporous layer material, and the second layer (e.g., the bottom layer) comprises a second microporous layer material. For example, the membrane has a planar top layer when viewed from above on an axis approximately perpendicular to the transverse and machine directions of the membrane, with the bottom planar layer hidden from view by the top layer. In another embodiment, the multi-layer, microporous membrane comprises three or more layers, wherein the outer layers (also called the "surface" or "skin" layers) comprise the first microporous layer material and at least one intermediate layer comprises the second microporous layer material. In a related embodiment, where the multi-layer, microporous membrane comprises two layers, the first layer consists essentially of (or consists of) the first microporous layer material and the second layer consists essentially of (or consists of) the second microporous layer material. In a related embodiment where the multi-layer, microporous membrane comprises three or more layers, the outer layers consist essentially of (or consists of) the first microporous layer material and at least one intermediate layer consists essentially of (or consists of) the second microporous layer material. The membrane can be referred to as a "polyolefin membrane" when the membrane contains polyolefin. While the membrane can contain polyolefin only, this is not required, and it is within the scope of the invention for the membrane to contain polyolefin and materials that are not polyolefin.

In yet another embodiment where the multi-layer, microporous membrane comprises three or more layers, the surface layers comprise (or consist essentially of, or consist of) the second microporous layer material and at least one intermediate layer comprises (or consists essentially of, or consists of) the first microporous layer material.

When the multi-layer, microporous membrane has three or more layers, the multi-layer, microporous polyolefin membrane has at least one layer comprising the first microporous layer material and at least one layer comprising the second microporous layer material.

In an embodiment, the sum of the thicknesses of the layers comprising the second layer material generally is in the range of about 3% to about 90%, or about 10% to about 60% of the total thickness of the multi-layer microporous membrane.

In an embodiment, the first microporous layer material comprises a first polypropylene and a first polyethylene. The second microporous layer material comprises a second polyethylene and a second polypropylene. The total amount of polyethylene in the multi-layer, microporous polyolefin membrane is in the range of from about 9.5 wt. % to about 95 wt. %, or from about 10 wt. % to about 60 wt. %, or from about 40 wt. % to about 80 wt. %, based on the weight of the multi-layer, microporous polyolefin membrane. The total amount of polypropylene in the multi-layer, microporous polyolefin membrane is in the range of from about 1.4 wt. % to about 90.5 wt. %, or from about 10 wt. % to about 60 wt. %, or from about 40 wt. % to about 80 wt. %, based on the weight of the multi-layer, microporous polyolefin membrane. In an embodiment, the first polyethylene is present in the first microporous layer material in a first polyethylene amount in the range of from about 50 wt. % to about 99% wt. % based on the weight of the first microporous layer material; the first polypropylene is present in the first microporous layer material in a first polypropylene amount in the range of from about 1 wt. % to about 50 wt. % based on the weight of the first microporous layer material; the second polyethylene is present in the second microporous layer material in a second polyethylene amount in the range of from about 5 wt. % to about 95 wt. % based on the weight of the second microporous layer material; and the second polypropylene is present in the second microporous layer material in a second polypropylene amount in the range of from about 5 wt. % to about 95 wt. % based on the weight of the second microporous layer material.

The first and second polyethylene and the first and second polypropylene will now be described in more detail.

A. The First Polyethylene

In an embodiment, the first polyethylene is a polyethylene having an Mw in the range of about $1\times10^4$ to about $1\times10^7$, or about $1\times10^5$ to about $5\times10^6$, or about $2\times10^5$ to about $3\times10^6$. The first polyethylene can be one or more varieties of polyethylene, e.g., PE1, PE2, etc. PE1 comprises polyethylene having an Mw ranging from about $1\times10^4$ to about $5\times10^5$. Optionally, the PE1 can be one or more of an high density polyethylene ("HDPE"), a medium-density polyethylene, a branched low-density polyethylene, or a linear low-density polyethylene. Although it is not critical, the Mw of high-density polyethylene can be in the range. e.g., of from about $1\times10^5$ to about $5\times10^5$, or from about $2\times10^5$ to about $4\times10^5$. In an embodiment, PE1 is at least one of (i) an ethylene homopolymer or (ii) a copolymer of ethylene and a third α-olefin such as propylene, butene-1, hexene-1, etc, typically in a relatively small amount compared to the amount of ethylene. Such a copolymer can be produced using a single-site catalyst.

In an embodiment, the first polyethylene comprises a second polyethylene, PE2. PE2 comprises polyethylene having an Mw of at least about $1\times10^6$. For example, PE2 can be an ultra-high molecular weight polyethylene ("UHMWPE"). In an embodiment, PE2 is at least one of (i) an ethylene homopolymer or (ii) a copolymer of ethylene and a fourth α-olefin which is typically present in a relatively small amount compared to the amount of ethylene. The fourth α-olefin can be, for example, one or more of propylene, butene-1, pentene-1, hexene-1,4-methylpentene-1, octene-1, vinyl acetate, methyl methacrylate, or styrene. Although it is not critical, the Mw of PE2 can be in the range. e.g., of from about $1\times10^6$ to about $15\times10^6$, or from about $1\times10^6$ to about $5\times10^6$, or from about $1\times10^6$ to about $3\times10^6$.

In an embodiment, the first polyethylene comprises both PE1 and PE2. In this case, the amount of PE2 in the first polyethylene can be, e.g., in the range of about 0 wt % to about 50 wt %, or about 1 wt. % to about 50 wt. %, based on the weight of the first polyethylene.

In one embodiment, the first polyethylene has one or more of the following independently-selected features:
(1) The first polyethylene comprises PE1
(2) The first polyethylene consists essentially of, or consists of, PE1.
(3) The PE1 is one or more of a high-density polyethylene, a medium-density polyethylene, a branched low-density polyethylene, or a linear low-density polyethylene.
(4) PE1 is one or more of a high-density polyethylene having an Mw ranging from about $1\times10^5$ to about $5\times10^5$, or from about $2\times10^5$ to about $4\times10^5$.
(5) PE1 is at least one of (i) an ethylene homopolymer or (ii) a copolymer of ethylene and a third α-olefin selected from the group of propylene, butene-1, hexene-1.
(6) The first polyethylene comprises both PE1 and PE2.
(7) PE2 has an Mw ranging from about $1\times10^6$ to about $15\times10^6$, or optionally from about $1\times10^6$ to about $5\times10^6$, or optionally from about $1\times10^6$ to about $3\times10^6$.
(8) PE2 is ultra-high-molecular-weight polyethylene.
(9) PE2 is at least one of (i) an ethylene homopolymer or (ii) a copolymer of ethylene and a fourth α-olefin selected from the group of propylene, butene-1, hexene-1.
(10) The first polyethylene has a molecular weight distribution ("Mw/Mn") of about 5 to about 300, or about 5 to about 100, or optionally from about 5 to about 30.

B. The Second Polyethylene

The second polyethylene can comprise PE1, PE2, or both PE1 and PE2. When the second polyethylene comprises PE1 and PE2, the amount of PE2 in the second polyethylene can be in the range of 0 wt % to about 50 wt %, or about 1 wt. % to about 50 wt. %, based on the weight of the second polyethylene.

C. The First Polypropylene

Besides polyethylene, the first and second microporous layer materials comprise polypropylene. The polypropylene can be, for example, one or more of (i) a propylene homopolymer or (ii) a copolymer of propylene and a fifth olefin. The copolymer can be a random or block copolymer. The fifth olefin can be, e.g., one or more of α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer microporous membrane such as heat resistance, compression resistance, heat shrinkage resistance, etc. For example, the amount of the fifth olefin can be less than 10% by mol based on 100% by mol of the entire copolymer. Optionally, the polypropylene has one or more of the following properties: (i) the polypropylene has an Mw ranging from about $1\times10^4$ to about $4\times10^6$, or about $3\times10^5$ to about $3\times10^6$; (ii) the polypropylene has an Mw/Mn ranging from about 1.01 to about 100, or about 1.1 to about 50; (iii) the polypropylene's tacticity is isotactic; (iv) the polypropylene has a heat of fusion of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 $\sec^{-1}$; and/or (vii) the polypropylene has an elongational viscosity of at least about 50,000 Pa sec at a temperature of 230° C. and a strain rate of 25 $\sec^{-1}$. Optionally The polypropylene has an Mw/Mn ranging from about 1.01 to about 100, or from about 1.1 to about 50.

D. The Second Polypropylene

The second polypropylene preferably has a weight-average molecular weight of $6\times10^5$ or more, and a heat of fusion ΔHm (measured by a differential scanning calorimeter (DSC) according to JIS K7122) of 90 J/g or more, a fraction of the polypropylene having a molecular weight of $5\times10^4$ or less (determined from a molecular weight distribution) being 5% or less by mass. A temperature-elevating speed for the measurement of the heat of fusion is preferably 3-20° C./minute, usually 10° C./minute. Because polypropylene having a weight-average molecular weight of less than $6\times10^5$ has low dispersibility in the polyethylene resin, its use makes stretching difficult, providing large micro-roughness to a surface of the second porous layer and large thickness variation to the multi-layer, microporous membrane. When a fraction of the polypropylene having a molecular weight of $5\times10^4$ or less is more than 5% by mass of the polypropylene, the multi-layer, microporous membrane may have undesirably low meltdown properties. When the polypropylene has a heat of fusion ΔHm of less than 90 J/g, the resultant multi-layer, microporous membrane may have low meltdown properties and permeability.

The weight-average molecular weight of the second polypropylene is preferably $6.5\times10^5$ or more, more preferably $8\times10^5$ or more. A fraction of the polypropylene having a molecular weight of $5\times10^4$ or less is preferably 4.5% or less by mass, more preferably, 3% or less by mass, of the polypropylene. The heat of fusion ΔHm of the polypropylene is preferably 95 J/g or more, more preferably 100 J/g or more.

The molecular weight distribution, Mw/Mn, is preferably 5 or less, more preferably 4 or less, most preferably 2.5 or less.

It is preferred that (1) if the weight-average molecular weight of the polypropylene is from $6\times10^5$ to $1\times10^6$ or less then the Mw/Mn of the polypropylene is 2.5 or less; (2) if the weight-average molecular weight is $1.5\times10^6$ or less then the Mw/Mn is 3 or less; (3) if the weight-average molecular weight is $2\times10^6$ or less then the Mw/Mn is 4 or less; and (4) if the weight-average molecular weight is $2\times10^6$ or more then the Mw/Mn is 5 or less.

The polypropylene content of the second layer material can be, e.g., in the range of from about 5-95% by mass, but preferably 20-80% by mass, more preferably 30-70% by mass, based on the mass of the second layer material. When the polypropylene content is less than 20% by mass, the meltdown temperature may be less desirable. When the polypropylene content exceeds 80% by mass, the multi-layer, microporous membrane tends to have less than desirable thickness uniformity and permeability.

As long as the above conditions of the weight-average molecular weight, a fraction having a molecular weight of $5\times10^4$ or less (determined from a molecular weight distribution), and the heat of fusion are met, the type of the polypropylene is not particularly critical, but may be a propylene homopolymer, a copolymer of propylene and the other α-olefin, or a mixture thereof, the homopolymer being preferable. The copolymer may be a random or block copolymer. The α-olefins in a polypropylene copolymer, the comonomer may include, for example, ethylene, butene-1, pentene-1, hexene-1,4-methylpentene-1, octene, vinyl acetate, methyl methacrylate, styrene, and combinations thereof. Optionally, the polypropylene has one or more of the following properties: (i) the polypropylene has an Mw in the range of from about $1\times10^4$ to about $4\times10^6$, or about $6\times10^5$ to about $3\times10^6$; (ii) the polypropylene has an Mw/Mn in the range of from about 1.01 to about 100, or about 1.1 to about 50; (iii) the polypropylene's tacticity is isotactic; (iv) the polypropylene has a heat of fusion of at least about 95 Joules/gram; (v) the polypropylene has a melting peak (second melt) of at least about 160° C., (vi) the polypropylene has a Trouton's ratio of at least about 15 when measured at a temperature of about 230° C. and a strain rate of 25 $sec^{-1}$; and/or (vii) the polypropylene has an elongational viscosity of at least about 50,000 Pa sec at a temperature of 230° C. and a strain rate of 25 $sec^{-1}$.

The Mw and Mn of polypropylene can be measured, e.g., by a GPC method under the following conditions. Measurement apparatus: Alliance 2000 GPC available from Waters Corp., Columns: Three PL Gel mixed-B available from Polymer Laboratories. Column temperature: 145° C., Solvent (mobile phase): 1,2,4-trichlorobenzene, stabilized with 0.1 wt % BHT, 6 g/4 L. Solvent flow rate: 1.0 ml/minute. Sample concentration: 0.25 mg/mL (dissolved at 175° C. for 1 hour). Injected amount: 300 µl. Detector: Differential Refractometer available from Waters Corp. Calibration curve: Produced from a calibration curve of a set of single-dispersion, standard polystyrene sample using a predetermined conversion constant.

The heat of fusion ΔHm of polypropylene can be measured according to JIS K7122 as follows: A PP sample was heat-treated at 190° C. for 10 minutes in a nitrogen atmosphere in a sample holder of a differential scanning calorimeter (DSC-System 7 available from Perkin Elmer, Inc.), cooled to 40° C. at a speed of 10° C./minute, kept at 40° C. for 2 minutes, and heated to 190° C. at a speed of 10° C./minute. As shown in FIG. 1, a straight line passing through points on a DSC curve (melting curve) obtained by the temperature-elevating process at 85° C. and 175° C. can be drawn as a base line, and the amount of heat was calculated from an area S1 of a hatched portion encircled by the base line and the DSC curve. The amount of heat (unit: J) was divided by the weight (unit: g) of the sample to determine the heat of fusion ΔHm (unit: J/g).

Figure 2:
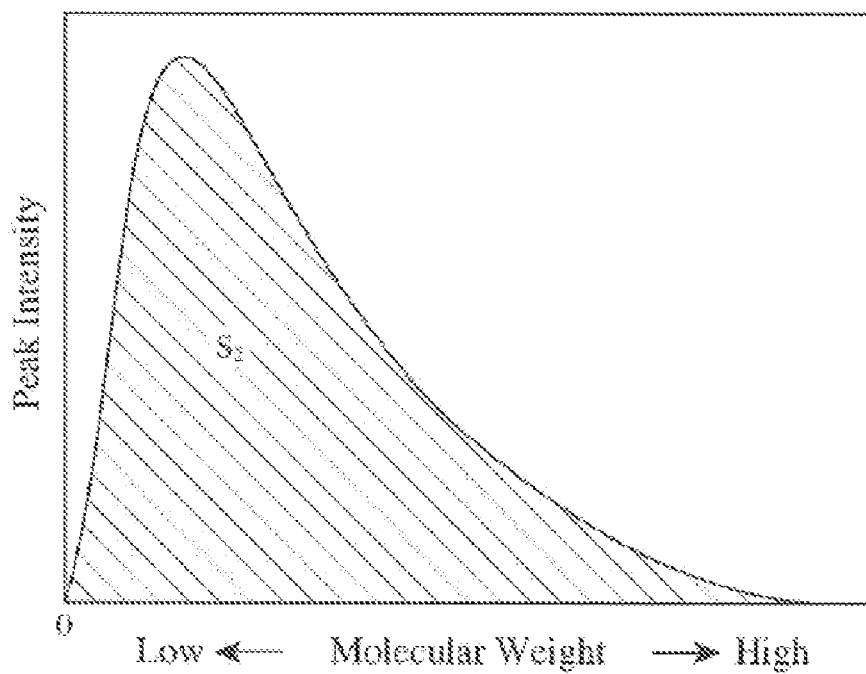
FIG. 2 is a graph showing another example of typical GPC curves.
Figure 3:
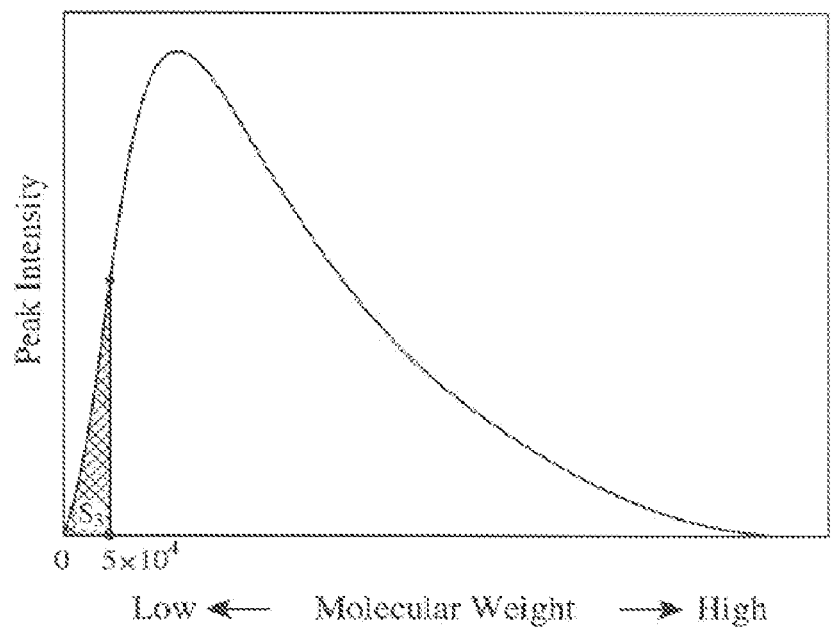
FIG. 3 is a graph showing the same GPC curve as in FIG. 2, in which a low-molecular-weight portion is hatched.
Figure 4:
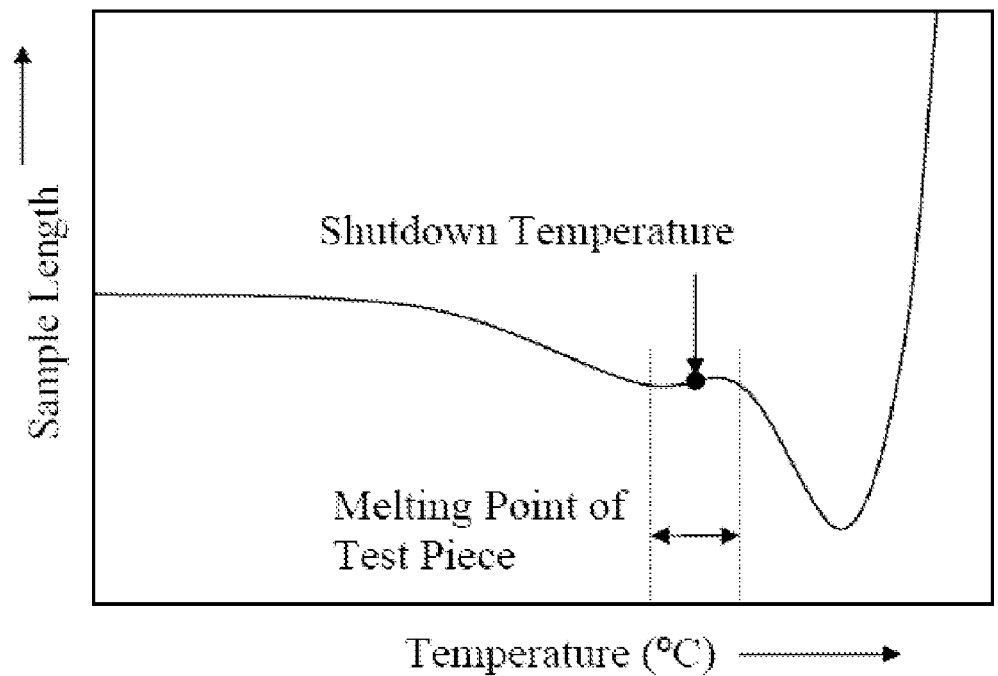
FIG. 4 is a graph showing one example of typical TMA measurement, the shutdown temperature is shown by an arrow.

The percentage (on a mass basis) of a polypropylene a fraction having a molecular weight of $5\times10^4$ or less can be determined as follows. To determine the amount of the entire polypropylene sample, an area S2 of a hatched portion encircled by the GPC curve and the base line in FIG. 2 can be measured. To determine the amount of the fraction having a molecular weight of $5\times10^4$ or less, an area S3 in FIG. 3 can be measured. The percentage of the fraction having a molecular weight of $5\times10^4$ or less was calculated by (S3/S2)×100 (mass %).

[2] Materials Used to Produce the Multi-Layer, Microporous Polyolefin Membrane

A. Polymer Resins Used to Make the First Microporous Layer Material

In an embodiment, the first microporous layer material is made from a first polyolefin solution. The first polyolefin solution comprises a first polyolefin composition and a first process solvent. Since the process produces a multi-layer microporous membrane, the process solvent is also referred to as a diluent or a membrane-forming solvent. The resins used to make the first polyolefin composition will now be described in more detail.

(1) The First Polyethylene Resin

In an embodiment, the first polyethylene resin comprises the first polyethylene, where the first polyethylene is as described above in section [1]. For example, the first polyethylene resin can be a mixture of a polyethylene resin having a lower Mw than UHMWPE (such as HDPE) and UHMWPE resin.

The molecular weight distribution (Mw/Mn") of the polyethylene in the first polyethylene resin is not critical. Mw/Mn is a measure of a molecular weight distribution; the larger this value, the wider the molecular weight distribution. Though not critical, the Mw/Mn of the polyethylene in the first polyethylene resin can be, e.g., in the range of from about 5 to about 300, or from about 5 to about 100, or from about 5 to about 30. When the Mw/Mn is less than 5, it can be more difficult to extrude the first polyethylene resin. On the other hand, when the Mw/Mn is more than 300, it can be more difficult to produce a relatively strong multi-layer microporous membrane. Multi-stage polymerization can be used to obtain the desired Mw/Mn ratio in the first polyethylene resin. For example, a two-stage polymerization method can be used, forming a relatively high-molecular-weight polymer component in the first stage, and forming a relatively low-molecular-weight polymer component in the second stage. While not required, this method can be used, for example, when the first polyethylene resin comprises PE1. When the first polyethylene resin comprises the PE1 and PE2, the desired Mw/Mn ratio of the polyethylene resin can be selected by adjusting the relative molecular weights and relative amounts of the first and second polyethylene.

(2) The First Polypropylene Resin

Besides the first polyethylene resin, the first polyolefin composition further comprises a first polypropylene resin. In an embodiment, the first polypropylene resin comprises the first polypropylene, where the first polypropylene is as described above in section [1]. The first polypropylene resin can be, for example, one or more of (i) a propylene homopolymer or (ii) a copolymer of propylene and a fifth olefin. The copolymer can be a random or block copolymer. The fifth olefin can be, e.g., one or more α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer should be in a range that does not adversely affect properties of the resulting multi-layer microporous membrane such as heat resistance, compression resistance, heat shrinkage resistance, etc. For example, the amount of the fifth olefin can be less than 10% by mol based on 100% by mol of the entire copolymer.

While it is not critical, the Mw of the polypropylene in the first polypropylene resin can be in the range. e.g., of from about $1 \times 10^4$ to about $4 \times 10^6$, or from about $3 \times 10^5$ to about $3 \times 10^6$. While it is not critical, the molecular weight distribution (Mw/Mn) of the polypropylene in the first polypropylene resin can range from about 1.01 to about 100, or from about 1.1 to about 50.

(3) Formulation

The amount of process solvent in the first polyolefin solution can be in the range. e.g., of from about 25 wt. % to about 99 wt. % based on the weight of the first polyolefin solution. In an embodiment, the amount of the first polyethylene resin in the first polyolefin composition can be in the range. e.g., of from about 50 wt. % to about 99 wt. % based on the weight of the first polyolefin composition. The balance of the first polyolefin composition can be the first polypropylene.

B. Polymer Resins Used to Produce the Second Microporous Layer Material

In an embodiment, the second microporous layer material is made from a second polyolefin solution that is generally selected independently of the first polyolefin solution. The second polyolefin solution comprises a second polyolefin composition and a second process solvent which can be the same as the first process solvent. As is the case in the first polyolefin solution, the second process solvent can be referred to as a second membrane-forming solvent or a second diluent. In an embodiment, the second polyolefin composition comprises a second polyethylene resin and a second polypropylene resin. The second polyethylene resin comprises the second polyethylene as described above in section [1]. The second polypropylene resin comprises the second polypropylene as described above in section [1].

The amount of process solvent in the second polyolefin solution can be in the range. e.g., of from about 25 wt. % to about 99 wt. % based on the weight of the second polyolefin solution. In an embodiment, the amount of the second polyethylene resin in the second polyolefin composition can be in the range. e.g., of from about 5 wt. % to about 95 wt. % based on the weight of the second polyolefin composition. The balance of the second polyolefin composition can be the second polypropylene.

C. Third Polyolefin

Although it is not required, each of the first and second polyolefin compositions can further comprise a third polyolefin selected from the group consisting of polybutene-1, polypentene-1, poly-4-methylpentene-1, polyhexene-1, polyoctene-1, polyvinyl acetate, polymethyl methacrylate, polystyrene and an ethylene α-olefin copolymer (except for an ethylene-propylene copolymer). In an embodiment where a third polyolefin is used, the third polyolefin can, for example, have an Mw in the range of about $1 \times 10^4$ to about $4 \times 10^6$. In addition to or besides the third polyolefin, the first and/or second polyolefin composition can further comprise a polyethylene wax, e.g., one having an Mw in the range of about $1 \times 10^3$ to about $1 \times 10^4$. When used, these species should be present in amounts less than an amount that would cause deterioration in the desired properties (e.g., meltdown, shutdown, etc.) of the multi-layer, microporous membrane. When the third polyolefin is one or more of polybutene-1, polypentene-1, poly-4-methylpentene-1, polyhexene-1, polyoctene-1, polyvinyl acetate, polymethyl methacrylate, and polystyrene, the third polyolefin need not be a homopolymer, but may be a copolymer containing other α-olefins.

The multi-layer microporous membrane generally comprises the polyolefin used to form the polyolefin solution. A small amount of washing solvent and/or process solvent can also be present, generally in amounts less than 1 wt % based on the weight of the microporous polyolefin membrane. A small amount of polyolefin molecular weight degradation might occur during processing, but this is acceptable. In an embodiment, molecular weight degradation during processing, if any, causes the value of Mw/Mn of the polyolefin in the membrane to differ from the Mw/Mn of the first or second polyolefin solution by no more than about 50%, or no more than about 1%, or no more than about 0.1%.

[3] Production Method of Multi-Layer, Microporous Polyolefin Membrane

In an embodiment, the microporous polyolefin membrane is a two-layer membrane. In another embodiment, the microporous polyolefin membrane has at least three layers. For the sake of brevity, the production of the microporous polyolefin membrane will be mainly described in terms of two-layer and three-layer membranes, although those skilled in the art will recognize that the same techniques can be applied to the production of membranes or membranes having at least four layers.

In an embodiment, the three-layer microporous polyolefin membrane comprises first and third microporous layers constituting the outer layers of the microporous polyolefin membrane and a second layer situated between (and optionally in planar contact with) the first and third layers. In an embodiment, the first and third layers are produced from the first polyolefin solution and the second (or inner) layer is produced from the second polyolefin solution. In another embodiment, the first and third layers are produced from the second polyolefin solution and the second layer is produced from the first polyolefin solution.

A. First Production Method

The first method for producing a multi-layer membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding (preferably simultaneously) the first and second polyolefin solutions through at least one die to form an extrudate, (4) cooling the extrudate to form a cooled extrudate, e.g., a multi-layer, gel-like sheet, (5) removing the membrane-forming solvent from the multi-layer, sheet to form a solvent-removed sheet, and (6) drying the solvent-removed gel-like sheet to remove volatile species, if any, in order to form the multi-layer, microporous polyolefin membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiation (11), and an optional hydrophilic treatment step (12), etc., can be conducted if desired. The order of the optional steps is not critical.

(1) Preparation of First Polyolefin Solution

The first polyolefin composition comprises polyolefin resins as described above that can be combined, e.g., by dry mixing or melt blending with an appropriate membrane-forming solvent to produce the first polyolefin solution. Optionally, the first polyolefin solution can contain various additives such as one or more antioxidant, fine silicate powder (pore-forming material), etc., provided these are used in a concentration range that does not significantly degrade the desired properties of the multi-layer, microporous polyolefin membrane.

The first process solvent (i.e., the first membrane-forming solvent) is preferably a solvent that is liquid at room temperature. While not wishing to be bound by any theory or model, it is believed that the use of a liquid solvent to form the first polyolefin solution makes it possible to conduct stretching of the gel-like sheet at a relatively high stretching magnification. In an embodiment, the first membrane-forming solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a melt blended state but solid at room temperature can be used, either alone or in combination with a liquid solvent. Such solid solvent can include, e.g., stearyl alcohol, ceryl alcohol, paraffin waxes, etc. Although it is not critical, it can be more difficult to evenly stretch the gel-like sheet or resulting membrane when the solution contains no liquid solvent.

The viscosity of the liquid solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer microporous polyolefin membrane.

In an embodiment, the resins, etc., used to produce to the first polyolefin composition are dry mixed or melt-blended in, e.g., a double screw extruder or mixer. For example, a conventional extruder (or mixer or mixer-extruder) such as a double-screw extruder can be used to combine the resins, etc., to form the first polyolefin composition. The membrane-forming solvent can be added to the polyolefin composition (or alternatively to the resins used to produce the polyolefin composition) at any convenient point in the process. For example, in an embodiment where the first polyolefin composition and the first membrane-forming solvent are melt-blended, the solvent can be added to the polyolefin composition (or its components) at any of (i) before starting melt-blending, (ii) during melt blending of the first polyolefin composition, or (iii) after melt-blending, e.g., by supplying the first membrane-forming solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the melt-blending temperature of the first polyolefin solution can range from about 10° C. higher than the melting point $Tm_1$ of the first polyethylene resin to about 120° C. higher than $Tm_1$. For brevity, such a range can be represented as $Tm_1+10°$ C. to $Tm_1+120°$ C. In an embodiment where the first polyethylene resin has a melting point of about 130° C. to about 140° C., the melt-blending temperature can be in the range of from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the first polyolefin composition in the first polyolefin solution is not critical. In an embodiment, the amount of first polyolefin composition in the first polyolefin solution can range from about 1 wt. % to about 75 wt. %, based on the weight of the polyolefin solution, for example from about 20 wt. % to about 70 wt. %. Although the amount of first polyolefin composition in the first polyolefin solution is not critical, when the amount is less than about 1 wt. %, it can be more difficult to produce the multi-layer microporous polyolefin membrane at an acceptably efficient rate. Moreover, when the amount is less than 1 wt. %, it can be more difficult to prevent swelling or neck-in at the die exit during extrusion, which can make it more difficult to form and support the multi-layer, gel-like sheet, which is a precursor of the membrane formed during the manufacturing process. On the other hand, when the amount of first polyolefin composition solution is greater than about 75 wt. %, it can be more difficult to form the multi-layer, gel-like sheet. The amount of the first polyethylene resin is preferably 1-50% by mass, more preferably 20-40% by mass, per 100% by mass of the first polyolefin solution. When the polyethylene resin is less than 1% by mass, large swelling or neck-in may occur at the die exit during the extrusion of the first polyolefin solution to form a gel-like molding, resulting in decrease in the formability and self-support of the gel-like molding. On the other hand, when the polyethylene resin is more than 50% by mass, the formability of the gel-like molding may be deteriorated.

(2) Preparation of Second Polyolefin Solution

The second polyolefin solution can be prepared by the same methods used to prepare the first polyolefin solution. For example, the second polyolefin solution can be prepared by melt-blending a second polyolefin composition with a second membrane-forming solvent. The second membrane-forming solvent can be selected from among the same solvents as the first membrane-forming solvent. And while the second membrane-forming solvent can be (and generally is) selected independently of the first membrane-forming solvent, the second membrane-forming solvent can be the same as the first membrane-forming solvent, and can be used in the same relative concentration as the first membrane-forming solvent is used in the first polyolefin solution.

The second polyolefin composition is generally selected independently of the first polyolefin composition. The second polyolefin composition comprises the second polyethylene resin and the second polypropylene resin.

In an embodiment, the method for preparing the second polyolefin solution differs from the method for preparing the first polyolefin solution, only in that the mixing temperature is preferably in a range from the melting point (Tm2) of the second polypropylene to Tm2+90° C., and that the polyolefin composition content is preferably 1-50% by mass, more preferably 20-40% by mass.

(3) Extrusion

In an embodiment, the first polyolefin solution is conducted from a first extruder to a first die and the second polyolefin solution is conducted from a second extruder to a second die. A layered extrudate in sheet form (i.e., a body significantly larger in the planar directions than in the thickness direction) can be extruded from the first and second die. Optionally, the first and second polyolefin solutions are co-extruded from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction of the extrudate and a second vector in the transverse direction of the extrudate.

In an embodiment, a die assembly is used where the die assembly comprises the first and second die, as for example when the first die and the second die share a common partition between a region in the die assembly containing the first polyolefin solution and a second region in the die assembly containing the second polyolefin solution.

In another embodiment, a plurality of dies is used, with each die connected to an extruder for conducting either the first or second polyolefin solution to the die. For example, in one embodiment, the first extruder containing the first polyolefin solution is connected to a first die and a third die, and a second extruder containing the second polyolefin solution is connected to a second die. As is the case in the preceding embodiment, the resulting layered extrudate can be co-extruded from the first, second, and third die (e.g., simultaneously) to form a three-layer extrudate comprising a first and a third layer constituting surface layers (e.g., top and bottom layers) produced from the first polyolefin solution; and a second layer constituting a middle or intermediate layer of the extrudate situated between and in planar contact with both surface layers, where the second layer is produced from the second polyolefin solution.

In yet another embodiment, the same die assembly is used but with the polyolefin solutions reversed, i.e., the second extruder containing the second polyolefin solution is connected to the first die and the third die, and the first extruder containing the first polyolefin solution is connected to the second die.

In any of the preceding embodiments, die extrusion can be conducted using conventional die extrusion equipment. For example, extrusion can be conducted by a flat die or an inflation die. In one embodiment useful for co-extrusion of multi-layer gel-like sheets, multi-manifold extrusion can be used, in which the first and second polyolefin solutions are conducted to separate manifolds in a multi-layer extrusion die and laminated at a die lip inlet. In another such embodiment, block extrusion can be used, in which the first and second polyolefin solutions are first combined into a laminar flow (i.e., in advance), with the laminar flow then connected to a die. Because multi-manifold and block processes are known to those skilled in the art of processing polyolefin films (e.g., as disclosed in JP06-122142 A, JP06-106599A), they are deemed conventional, therefore, their operation will be not described in detail.

Die selection is not critical, and, e.g., a conventional multi-layer-sheet-forming, flat or inflation die can be used. Die gap is not critical. For example, the multi-layer-sheet-forming flat die can have a die gap of about 0.1 mm to about 5 mm. Die temperature and extruding speed are also non-critical parameters. For example, the die can be heated to a die temperature ranging from about 140° C. to about 250° C. during extrusion. The extruding speed can range, for example, from about 0.2 m/minute to about 15 m/minute. The thickness of the layers of the layered extrudate can be independently selected. For example, the gel-like sheet can have relatively thick surface layers (or "skin" layers) compared to the thickness of an intermediate layer of the layered extrudate.

While the extrusion has been described in terms of embodiments producing two and three-layer extrudates, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

(4) Formation of a Multi-Layer, Gel-Like Sheet

The multi-layer extrudate can be formed into a multi-layer, gel-like sheet by cooling, for example. Cooling rate and cooling temperature are not particularly critical. For example, the multi-layer, gel-like sheet can be cooled at a cooling rate of at least about 50° C./minute until the temperature of the multi-layer, gel-like sheet (the cooling temperature) is approximately equal to the multi-layer, gel-like sheet's gelation temperature (or lower). In an embodiment, the extrudate is cooled to a temperature of about 25° C. or lower in order to form the multi-layer gel-like sheet. While not wishing to be bound by any theory or model, it is believed that cooling the layered extrudate sets the polyolefin micro-phases of the first and second polyolefin solutions for separation by the membrane-forming solvent or solvents. It has been observed that in general a slower cooling rate (e.g., less than 50° C./minute) provides the multi-layer, gel-like sheet with larger pseudo-cell units, resulting in a coarser higher-order structure. On the other hand, a relatively faster cooling rate (e.g., 80° C./minute) results in denser cell units. Although it is not a critical parameter, when the cooling rate of the extrudate is less than 50° C./minute, increased polyolefin crystallinity in the layer can result, which can make it more difficult to process the multi-layer, gel-like sheet in subsequent stretching steps. The choice of cooling method is not critical. For example conventional sheet cooling methods can be used. In an embodiment, the cooling method comprises contacting the layered extrudate with a cooling medium such as cooling air, cooling water, etc. Alternatively, the extrudate can be cooled via contact with rollers cooled by a cooling medium, etc.

(5) Removal of the First and Second Membrane-Forming Solvents

In an embodiment, at least a portion of the first and second membrane-forming solvents are removed (or displaced) from the multi-layer gel-like sheet in order to form a solvent-removed gel-like sheet. A displacing (or "washing") solvent can be used to remove (wash away, or displace) the first and second membrane-forming solvents. While not wishing to be bound by any theory or model, it is believed that because the polyolefin phases in the multi-layer gel-like sheet produced from the first polyolefin solution and the second polyolefin solution (i.e., the first polyolefin and the second polyolefin) are separated from the membrane-forming solvent phase, the removal of the membrane-forming solvent provides a porous membrane constituted by fibrils forming a fine three-dimensional network structure and having pores communicating three-dimensionally and irregularly. The choice of washing solvent is not critical provided it is capable of dissolving or displacing at least a portion of the first and/or second membrane-forming solvent. Suitable washing solvents include, for instance, one or more of volatile solvents such as saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc.

The method for removing the membrane-forming solvent is not critical, and any method capable of removing a significant amount of solvent can be used, including conventional solvent-removal methods. For example, the multi-layer, gel-like sheet can be washed by immersing the sheet in the washing solvent and/or showering the sheet with the washing solvent. The amount of washing solvent used is not critical, and will generally depend on the method selected for removal of the membrane-forming solvent. For example, the amount of washing solvent used can range from about 300 to about 30,000 parts by mass, based on the mass of the gel-like sheet. While the amount of membrane-forming solvent removed is not particularly critical, generally a higher quality (more porous) membrane will result when at least a major amount of first and second membrane-forming solvent is removed from the gel-like sheet. In an embodiment, the membrane-forming solvent is removed from the gel-like sheet (e.g., by washing) until the amount of the remaining membrane-forming solvent in the multi-layer gel-like sheet becomes less than 1 wt. %, based on the weight of the gel-like sheet.

(6) Drying of the Solvent-Removed Gel-Like Sheet

In an embodiment, the solvent-removed multi-layer, gel-like sheet obtained by removing at least a portion of the membrane-forming solvent is dried in order to remove the washing solvent. Any method capable of removing the washing solvent can be used, including conventional methods such as heat-drying, wind-drying (moving air), etc. The temperature of the gel-like sheet during drying (i.e., drying temperature) is not critical. For example, the drying temperature can be equal to or lower than the crystal dispersion temperature Tcd. Tcd is the lower of the crystal dispersion temperature $Tcd_1$ of the first polyethylene resin and the crystal dispersion temperature $Tcd_2$ of the second polyethylene resin (when used). For example, the drying temperature can be at least 5° C. below the crystal dispersion temperature Tcd. The crystal dispersion temperature of the first and second polyethylene resin can be determined by measuring the temperature characteristics of the kinetic viscoelasticity of the polyethylene resin according to ASTM D 4065. In an embodiment, at least one of the first or second polyethylene resins have a crystal dispersion temperature in the range of about 90° C. to about 100° C.

Although it is not critical, drying can be conducted until the amount of remaining washing solvent is about 5 wt. % or less on a dry basis, i.e., based on the weight of the dry multi-layer, microporous polyolefin membrane. In another embodiment, drying is conducted until the amount of remaining washing solvent is about 3 wt. % or less on a dry basis. Insufficient drying can be recognized because it generally leads to an undesirable decrease in the porosity of the multi-layer, microporous membrane. If this is observed, an increased drying temperature and/or drying time should be used. Removal of the washing solvent, e.g., by drying or otherwise, results in the formation of the multi-layer, microporous polyolefin membrane.

(7) Stretching

Prior to the step for removing the membrane-forming solvents (namely prior to step 5), the multi-layer, gel-like sheet can be stretched in order to obtain a stretched, multi-layer, gel-like sheet. It is believed that the presence of the first and second membrane-forming solvents in the multi-layer, gel-like sheet results in a relatively uniform stretching magnification. Heating the multi-layer, gel-like sheet, especially at the start of stretching or in a relatively early stage of stretching (e.g., before 50% of the stretching has been completed) is also believed to aid the uniformity of stretching.

Neither the choice of stretching method nor the degree of stretching magnification are particularly critical. For example, any method capable of stretching the multi-layer, gel-like sheet to a predetermined magnification (including any optional heating) can be used. In an embodiment, the stretching can be accomplished by one or more of tenter-stretching, roller-stretching, or inflation stretching (e.g., with air). Although the choice is not critical, the stretching can be conducted monoaxially (i.e., in either the machine or transverse direction) or biaxially (both the machine or transverse direction). In an embodiment, biaxial stretching is used. In the case of biaxial stretching (also called biaxial orientation), the stretching can be simultaneous biaxial stretching, sequential stretching along one planar axis and then the other (e.g., first in the transverse direction and then in the machine direction), or multi-stage stretching (for instance, a combination of the simultaneous biaxial stretching and the sequential stretching). In an embodiment, simultaneous biaxial stretching is used.

The stretching magnification is not critical. In an embodiment where monoaxial stretching is used, the linear stretching magnification can be, e.g., about 2 fold or more, or about 3 to about 30 fold. In an embodiment where biaxial stretching is used, the linear stretching magnification can be, e.g., about 3 fold or more in any planar direction. In another embodiment, the area magnification resulting from stretching is at least about 9 fold, or at least about 16 fold, or at least about 25 fold. Although it is not a critical parameter, when the stretching results in an area magnification of at least about 9 fold, the multi-layer microporous polyolefin membrane has a relatively higher pin puncture strength. When attempting an area magnification of more than about 400 fold, it can be more difficult to operate the stretching apparatus.

The temperature of the multi-layer, gel-like sheet during stretching (namely the stretching temperature) is not critical. In an embodiment, the temperature of the gel-like sheet during stretching can be about (Tm+10° C.) or lower, or optionally in a range that is higher than Tcd but lower than Tm, wherein Tm is the lesser of the melting point $Tm_1$ of the first polyethylene and the melting point $Tm_2$ of the second polyethylene (when used). Although this parameter is not critical, when the stretching temperature is higher than approximately the melting point Tm+10° C., at least one of the first or second polyethylene can be in the molten state, which can make it more difficult to orient the molecular chains of the polyolefin in the multi-layer gel-like sheet during stretching. And when the stretching temperature is lower than approximately Tcd, at least one of the first or second polyethylene can be so insufficiently softened that it is difficult to stretch the multi-layer, gel-like sheet without breakage or tears, which can result in a failure to achieve the desired stretching magnification. In an embodiment, the stretching temperature ranges from about 90° C. to about 140° C., or from about 100° C. to about 130° C.

While not wishing to be bound by any theory or model, it is believed that such stretching causes cleavage between polyethylene lamellas, making the polyethylene phases finer and forming large numbers of fibrils. The fibrils form a three-dimensional network structure (three-dimensionally irregularly connected network structure). Consequently, the stretching when used generally makes it easier to produce a relatively high-mechanical strength multi-layer, microporous polyolefin membrane with a relatively large pore size. Such multi-layer, microporous membranes are believed to be particularly suitable for use as battery separators.

Optionally, stretching can be conducted in the presence of a temperature gradient in a thickness direction (i.e., a direction approximately perpendicular to the planar surface of the multi-layer, microporous polyolefin membrane). In this case, it can be easier to produce a multi-layer, microporous polyolefin membrane with improved mechanical strength. The details of this method are described in Japanese Patent 3347854.

(8) Hot Solvent Treatment Step

Although it is not required, the multi-layer, gel-like sheet can be treated with a hot solvent between steps (4) and (5). When used, it is believed that the hot solvent treatment provides the fibrils (such as those formed by stretching the multi-layer gel-like sheet) with a relatively thick leaf-vein-like structure. Such a structure, it is believed, makes it less difficult to produce a multi-layer, microporous membrane having large pores with relatively high strength and permeability. The term "leaf-vein-like" means that the fibrils have thick trunks and thin fibers extending therefrom in a network structure. The details of this method are described in WO 2000/20493.

(9) Stretching of Multi-Layer, Microporous Membrane ("Dry Stretching")

In an embodiment, the dried multi-layer, microporous membrane of step (6) can be stretched, at least monoaxially. The stretching method selected is not critical, and conventional stretching methods can be used such as by a tenter method, etc. While it is not critical, the membrane can be heated during stretching. While the choice is not critical, the stretching can be monoaxial or biaxial. When biaxial stretching is used, the stretching can be conducted simultaneously in both axial directions, or, alternatively, the multi-layer, microporous polyolefin membrane can be stretched sequentially, e.g., first in the machine direction and then in the transverse direction. In an embodiment, simultaneous biaxial stretching is used. When the multi-layer gel-like sheet has been stretched as described in step (7) the stretching of the dry multi-layer, microporous polyolefin membrane in step (9) can be called dry-stretching, re-stretching, or dry-orientation.

The temperature of the dry multi-layer, microporous membrane during stretching (the "dry stretching temperature") is not critical. In an embodiment, the dry stretching temperature is approximately equal to the melting point Tm or lower, for example in the range of from about the crystal dispersion temperature Tcd to the about the melting point Tm. When the dry stretching temperature is higher than Tm, it can be more difficult to produce a multi-layer, microporous polyolefin membrane having a relatively high compression resistance with relatively uniform air permeability characteristics, particularly in the transverse direction when the dry multi-layer, microporous polyolefin membrane is stretched transversely. When the stretching temperature is lower than Tcd, it can be more difficult to sufficiently soften the first and second polyolefins, which can lead to tearing during stretching, and a lack of uniform stretching. In an embodiment, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 1.8 fold in at least one planar (e.g., lateral) direction. Thus, in the case of monoaxial stretching, the stretching magnification can range from about 1.1 fold to about 1.8 fold in the longitudinal direction (i.e., the "machine direction") or the transverse direction, depending on whether the membrane is stretched longitudinally or transversely. Monoaxial stretching can also be accomplished along a planar axis between the longitudinal and transverse directions.

In an embodiment, biaxial stretching is used (i.e., stretching along two planar axis) with a stretching magnification of about 1.1 fold to about 1.8 fold along both stretching axes, e.g., along both the longitudinal and transverse directions. The stretching magnification in the longitudinal direction need not be the same as the stretching magnification in the transverse direction. In other words, in biaxial stretching, the stretching magnifications can be selected independently. In an embodiment, the dry-stretching magnification is the same in both stretching directions.

(10) Heat Treatment

In an embodiment, the dried multi-layer, microporous membrane can be heat-treated following step (6). It is believed that heat-treating stabilizes the polyolefin crystals in the dried multi-layer, microporous polyolefin membrane to form uniform lamellas. In an embodiment, the heat treatment comprises heat-setting and/or annealing. When heat-setting is used, it can be conducted using conventional methods such as tenter methods and/or roller methods. Although it is not critical, the temperature of the dried multi-layer, microporous polyolefin membrane during heat-setting (i.e., the "heat-setting temperature") can range from the Tcd to about the Tm. In an embodiment, the heat-setting temperature ranges from about the dry stretching temperature of the multi-layer, microporous polyolefin membrane ±5° C., or about the dry stretching temperature of the multi-layer, microporous polyolefin membrane ±3° C.

Annealing differs from heat-setting in that it is a heat treatment with no load applied to the multi-layer, microporous polyolefin membrane. The choice of annealing method is not critical, and it can be conducted, for example, by using a heating chamber with a belt conveyer or an air-floating-type heating chamber. Alternatively, the annealing can be conducted after the heat-setting with the tenter clips slackened. The temperature of the multi-layer, microporous polyolefin membrane during annealing (i.e., the annealing temperature) is not critical. In an embodiment, the annealing temperature ranges from about the melting point Tm or lower, or in a range from about 60° C. to (Tm−10° C.). It is believed that annealing makes it less difficult to produce a multi-layer, microporous polyolefin membrane having relatively high permeability and strength.

(11) Cross-Linking

In an embodiment, the multi-layer, microporous polyolefin membrane can be cross-linked (e.g., by ionizing radiation rays such as α-rays, β-rays, γ-rays, electron beams, etc.) after step (6). For example, when irradiating electron beams are used for cross-linking, the amount of electron beam radiation can be about 0.1 Mrad to about 100 Mrad, using an accelerating voltage in the range of about 100 kV to about 300 kV. It is believed that the cross-linking treatment makes it less difficult to produce a multi-layer, microporous polyolefin membrane with relatively high meltdown temperature.

(12) Hydrophilizing Treatment

In an embodiment, the multi-layer, microporous polyolefin membrane can be subjected to a hydrophilic treatment (i.e., a treatment which makes the multi-layer, microporous polyolefin membrane more hydrophilic). The hydrophilic treatment can be, for example, a monomer-grafting treatment, a surfactant treatment, a corona-discharging treatment, etc. In an embodiment, the monomer-grafting treatment is used after the cross-linking treatment.

When a surfactant treatment is used, any of nonionic surfactants, cationic surfactants, anionic surfactants and amphoteric surfactants can be used, for example, either alone or in combination. In an embodiment, a nonionic surfactant is used. The choice of surfactant is not critical. For example, the multi-layer, microporous polyolefin membrane can be dipped in a solution of the surfactant and water or a lower alcohol such as methanol, ethanol, isopropyl alcohol, etc., or coated with the solution, e.g., by a doctor blade method.

B. Second Production Method

The second method for producing the multi-layer, microporous polyolefin membrane comprises the steps of (1) combining (e.g., by melt-blending) a first polyolefin composition and a first membrane-forming solvent to prepare a first polyolefin solution, (2) combining a second polyolefin composition and a second membrane-forming solvent to prepare a second polyolefin solution, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet, (5) removing at least a portion of the membrane-forming solvent from the multi-layer, gel-like sheet to form a solvent-removed gel-like sheet, and (6) drying the solvent-removed gel-like sheet in order to form the multi-layer, microporous membrane. An optional stretching step (7), and an optional hot solvent treatment step (8), etc., can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

The process steps and conditions of the second production method are generally the same as those of the analogous steps described in connection with the first production method, except for step (3). Consequently, step (3) will be explained in more detail.

The type of die used is not critical provided the die is capable of forming an extrudate that can be laminated. In one embodiment, sheet dies (which can be adjacent or connected) are used to form the extrudates. The first and second sheet dies are connected to first and second extruders, respectively, where the first extruder contains the first polyolefin solution and the second extruder contains the second polyolefin solution. While not critical, lamination is generally easier to accomplish when the extruded first and second polyolefin solution are still at approximately the extrusion temperature. The other conditions may be the same as in the first method.

In another embodiment, the first, second, and third sheet dies are connected to first, second and third extruders, where the first and third sheet dies contain the first polyolefin solutions, and the second sheet die contains the second polyolefin solution. In this embodiment, a laminated extrudate is formed constituting outer layers comprising the extruded first polyolefin solution and one intermediate comprising the extruded second polyolefin solution.

In yet another embodiment, the first, second, and third sheet dies are connected to first, second, and third extruders, where the second sheet die contains the first polyolefin solution, and the first and third sheet dies contain the second polyolefin solution. In this embodiment, a laminated extrudate is formed constituting outer layers comprising the extruded second polyolefin solution and one intermediate comprising extruded first polyolefin solution.

C. Third Production Method

The third method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing at least a portion of the membrane-forming solvent from the resultant multi-layer, gel-like sheet to form a solvent-removed gel-like sheet, and (8) drying the solvent-removed gel-like sheet in order to form the multi-layer, microporous membrane. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc., can be conducted.

The main difference between the third production method and the second production method is in the order of the steps for laminating and cooling.

In the second production method, laminating the first and second polyolefin solutions is conducted before the cooling step. In the third production method, the first and second polyolefin solutions are cooled before the laminating step.

The steps of (1), (2), (7) and (8) in the third production method can be the same as the steps of (1), (2), (5) and (6) in the first production method as described above. For the extrusion of the first polyolefin solution through the first die, the conditions of step (3) of the second production method can be used for step (3) of the third production method. For the extrusion of the second solution through the second die, the conditions of step (4) in the third production method can be the same as the conditions of step (3) in the second production method. In one embodiment, either the first or second polyolefin solution is extruded through a third die. In this way, a multi-layer laminate can be formed having two layers produced from the first polyolefin solution and a single layer produced from the second polyolefin solution, or vice versa.

Step (5) of the third production method can be the same as step (4) in the first production method except that in the third production method the first and second gel-like sheets are formed separately.

The step (6) of laminating the first and second gel-like sheets will now be explained in more detail. The choice of lamination method is not particularly critical, and conventional lamination methods such as heat-induced lamination can be used to laminate the multi-layer gel-like sheet. Other suitable lamination methods include, for example, heat-sealing, impulse-sealing, ultrasonic-bonding, etc., either alone or in combination. Heat-sealing can be conducted using, e.g., one or more pair of heated rollers where the gel-like sheets are conducted through at least one pair of the heated rollers. Although the heat-sealing temperature and pressure are not particularly critical, sufficient heating and pressure should be applied for a sufficient time to ensure that the gel-like sheets are appropriately bonded to provide a multi-layer, microporous membrane with relatively uniform properties and little tendency toward delamination. In an embodiment, the heat-sealing temperature can be, for instance, about 90° C. to about 135° C., or from about 90° C. to about 115° C. In an embodiment, the heat-sealing pressure can be from about 0.01 MPa to about −50 MPa.

As is the case in the first and second production method, the thickness of the layers formed from the first and second polyolefin solution (i.e., the layers comprising the first and second microporous layer materials) can be controlled by adjusting the thickness of the first and second gel-like sheets and by the amount of stretching (stretching magnification and dry stretching magnification), when one or more stretching steps are used. Optionally, the lamination step can be combined with a stretching step by passing the gel-like sheets through multi-stages of heated rollers.

In an embodiment, the third production method forms a multi-layer, polyolefin gel-like sheet having at least three layers. For example, after cooling two extruded first polyolefin solutions and one extruded second polyolefin solution to form the gel-like sheets, the multi-layer gel-like sheet can be laminated with outer layers comprising the extruded first polyolefin solution and an intermediate layer comprising the extruded second polyolefin solution. In another embodiment, after cooling two extruded second polyolefin solutions and one extruded first polyolefin solution to form the gel-like sheets, the multi-layer gel-like sheet can be laminated with outer layers comprising the extruded second polyolefin solution and an intermediate layer comprising the extruded first polyolefin solution.

The stretching step (9) and the hot solvent treatment step (10) can be the same as the stretching step (7) and the hot solvent treatment step (8) as described for the first production method, except stretching step (9) and hot solvent treatment step (10) are conducted on the first and/or second gel-like sheets. The stretching temperatures of the first and second gel-like sheets are not critical. For example, the stretching temperatures of the first gel-like sheet can be, e.g., $Tm_1+10°$ C. or lower, or optionally about $Tcd_1$ or higher but lower than about $Tm_1$. The stretching temperature of the second gel-like sheet can be, e.g., $Tm_2+10°$ C. or lower, or optionally about $Tcd_2$ or higher but lower than about $Tm_2$.

D. Fourth Production Method

The fourth method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing at least a portion of the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous polyolefin membranes in order to form the multi-layer, microporous polyolefin membrane.

A stretching step (9), a hot solvent treatment step (10), etc., can be conducted between steps (5) and (6), if desired. A stretching step (11), a heat treatment step (12), etc., can be conducted between steps (7) and (8), if desired. After step (8), a step (13) of stretching a multi-layer, microporous membrane, a heat treatment step (14), a cross-linking step with ionizing radiations (15), a hydrophilic treatment step (16), etc., can be conducted if desired.

Steps (1) and (2) in the fourth production method can be conducted under the same conditions as steps of (1) and (2) in the first production method. Steps (3), (4), and (5) in the fourth production method can be conducted under the same conditions as steps (3), (4), and (5) in the third method. Step (6) in the fourth production method can be conducted under the same conditions as step (5) in the first production method except for removing the membrane-forming solvent from the first and second gel-like sheets. Step (7) in the fourth production method can be conducted under the same conditions as step (6) in the first production method except that in the fourth production method the first and second solvent-removed gel-like sheets are dried separately. Step (8) in the fourth production method can be conducted under the same conditions as the step (6) in the third production method except for laminating the first and second polyolefin microporous membranes. The stretching step (9) and the hot solvent treatment step (10) in the fourth production method can be conducted under the same conditions as step (9) and (10) in the third production method. The stretching step (11) and the heat treatment step (12) in the fourth production method can be conducted under the same conditions as steps (9) and (10) in the first production method except that in the fourth production method the first and second polyolefin microporous membranes are stretched and/or heat treated.

In an embodiment, in the stretching step (11) in the fourth production method, the stretching temperature of the first polyolefin microporous membranes can be about $Tm_1$ or lower, or optionally about $Tcd_1$ to about $Tm_1$, and the stretching temperature of the second polyolefin microporous membrane can be about $Tm_2$ or lower, or optionally about $Tcd_2$ to about $Tm_2$.

In an embodiment, the heat treatment step (12) in the fourth production method can be HS and/or annealing. For example, in the heat treatment step (12) in the fourth production method, the heat-setting temperature of the first polyolefin microporous membranes can be about $Tcd_1$ to about $Tm_1$, or optionally about the dry stretching temperature ±5° C., or optionally about the dry stretching temperature ±3° C. In an embodiment, in the heat treatment step (12) in the fourth production method, the heat-setting temperature of the second microporous membrane can be about $Tcd_2$ to about $Tm_2$, or optionally the dry stretching temperature ±5° C., or optionally the dry stretching temperature ±3° C. When the HS is used, it can be conducted by, e.g., a tenter method or a roller method.

In an embodiment, in the heat treatment step (12) in the fourth production method, the annealing temperature of the first microporous membrane can be about $Tm_1$ or lower, or optionally about 60° C. to about ($Tm_1-10°$ C.). In an embodiment, in the heat treatment step (12) in the fourth production method, the annealing temperature of the second microporous membranes can be about $Tm_2$ or lower, or optionally about 60° C. to about ($Tm_2$–10° C.).

The conditions in step (13), stretching a multi-layer, microporous membrane, a heat treatment step (14), a cross-linking step with ionizing radiations (15), and a hydrophilic treatment step (16) in the fourth production method can be the same as those for steps (9), (10), (11) and (12) in the first production method.

[4] The Properties of a Multi-Layer, Microporous Polyolefin Membrane

In an embodiment, the multi-layer, microporous polyolefin membrane has a thickness ranging from about 3 μm to about 200 μm, or about 5 μm to about 50 μm. Optionally, the multi-layer, microporous polyolefin membrane has one or more of the following characteristics.

A. Porosity of about 25% to about 80%

When the porosity is less than 25%, the multi-layer, microporous polyolefin membrane generally does not exhibit the desired air permeability for use as a battery separator. When the porosity exceeds 80%, it is more difficult to produce a battery separator of the desired strength, which can increase the likelihood of internal electrode short-circuiting.

B1. Air Permeability of about 20 seconds/100 cm$^3$ to about 700 Seconds/100 cm$^3$ (Converted to Value at 20-μm Thickness)

When the air permeability of the multi-layer, microporous polyolefin membrane (as measured according to JIS P8117) ranges from about 20 seconds/100 cm$^3$ to about 700 seconds/100 cm$^3$, it is less difficult to form batteries having the desired charge storage capacity and desired cyclability. When the air permeability is less than about 20 seconds/100 cm$^3$, it is more difficult to produce a battery having the desired shutdown characteristics, particularly when the temperatures inside the batteries are elevated. Air permeability $P_1$ measured on a multi-layer, microporous membrane having a thickness $T_1$ according to JIS P8117 can be converted to air permeability $P_2$ at a thickness of 20 μm by the equation of $P_2=(P_1\times 20)/T_1$.

B2. Air Permeability after Heat Compression of about 100 Seconds/100 cm$^3$ to about 1000 Seconds/100 cm$^3$ The present multi-layer microporous membrane when heat-compressed at 90° C. under pressure of 2.2 MPa for 5 minutes has air permeability (as measured according to JIS P8117) of about 1000 sec/100 cm$^3$ or less, such as from about 100 to about 1000 sec/100 cm$^3$. Batteries using such membranes have suitably large capacity and cyclability. The air permeability after heat compression is preferably, for example, 950 sec/100 cm$^3$ or less.

C. Pin Puncture Strength of about 2,000 mN/20 μm or More

The pin puncture strength (converted to the value at a 20-μm membrane thickness) is the maximum load measured when the multi-layer, microporous polyolefin membrane is pricked with a needle 1 mm in diameter with a spherical end surface (radius R of curvature: 0.5 mm) at a speed of 2 mm/second. When the pin puncture strength of the multi-layer, microporous polyolefin membrane is less than 2,000 mN/20 μm, it is more difficult to produce a battery having the desired mechanical integrity, durability, and toughness.

D. Standard Deviation of Thickness of about 5 μm or Less

When the standard deviation of the multi-layer microporous polyolefin membrane exceeds about 5 μm, it is more difficult to produce a battery having the desired protection against internal short-circuiting. The standard deviation of thickness of the multi-layer microporous polyolefin membrane can be measured by a contact thickness meter at a 10 mm interval in the area of 10 cm×10 cm of the membrane. The standard deviation of thickness is preferably 3 μm or less, more preferably 1 μm or less.

E. Shutdown Temperature of about 140° C. or Lower

When the shutdown temperature of the multi-layer, microporous polyolefin membrane exceeds 140° C., it is more difficult to produce a battery separator with the desired shutdown response when the battery is overheated. One way to determine shutdown temperature involves determining the temperature at a point of inflection observed near the melting point of the multi-layer, microporous polyolefin membrane, under the condition that a test piece of 3 mm in the longitudinal direction and 10 mm in the transverse direction is heated from room temperature at a speed of 5° C./minute while drawing the test piece in the longitudinal direction under a load of 2 g. In an embodiment, the shutdown temperature is in the range of about 120-140° C.

F. Meltdown Temperature of at Least about 170° C.

In an embodiment, the meltdown temperature can range from about 170° C. to about 190° C. One way to measure meltdown temperature involves determining the temperature at which a multi-layer, microporous polyolefin membrane test piece of 3 mm in the longitudinal direction and 10 mm in the transverse direction is broken by melting, under the conditions that the test piece is heated from room temperature at a heating rate of 5° C./minute while drawing the test piece in the longitudinal direction under a load of 2 g.

G. Battery Capacity Recovery Ratio of 70% or more (Retention Property of Lithium Secondary Battery)

When the lithium ion secondary battery comprising a separator formed by a multi-layer, microporous membrane is stored at a temperature of 80° C. for 30 days, it is desired that the battery capacity recovery ratio [(capacity after high-temperature storing)/(initial capacity)]×100(%) should be 70% or more. The battery capacity recovery ratio is preferably 75% or more.

H. Thickness Variation Ratio of 20% or Less after Heat Compression

The thickness variation ratio after heat compression at 90° C. under pressure of 2.2 MPa for 5 minutes is generally 20% or less per 100% of the thickness before compression, preferably less than 10%. Batteries comprising microporous membrane separators with a thickness variation ratio of 20% or less have suitably large capacity and good cyclability.

[5] Battery Separator

In and embodiment, the battery separator formed by the above multi-layer, microporous polyolefin membrane has a thickness in the range of about 3 μm to about 200 μm, or about 5 μm to about 50 μm. Depending, e.g., on the choice of electrolyte, separator swelling might increase the final thickness to a value larger than 200 μm.

[6] Battery

In an embodiment, the multi-layer, microporous polyolefin membrane can be used as a separator for primary and secondary batteries such as lithium ion batteries, lithium-polymer secondary batteries, nickel-hydrogen secondary batteries, nickel-cadmium secondary batteries, nickel-zinc secondary batteries, silver-zinc secondary batteries, and particularly for lithium ion secondary batteries. Explanations will be made below on the lithium ion secondary batteries.

The lithium secondary battery comprises a cathode, an anode, and a separator located between the anode and the cathode. The separator generally contains an electrolytic solution (electrolyte). The electrode structure is not critical, and conventional electrode structures can be used. The electrode structure may be, for instance, a coin type in which a disc-shaped cathode and anode are opposing, a laminate type in which a planar cathode and anode are alternately laminated with at least one separator situated between the anode and the cathode, a toroidal type in which ribbon-shaped cathode and anode are wound, etc.

The cathode generally comprises a current collector, and a cathodic-active material layer capable of absorbing and discharging lithium ions, which is formed on the current collector. The cathodic-active materials can be, e.g., inorganic compounds such as transition metal oxides, composite oxides of lithium and transition metals (lithium composite oxides), transition metal sulfides, etc. The transition metals can be, e.g., V, Mn, Fe, Co, Ni, etc. In an embodiment, the lithium composite oxides are lithium nickelate, lithium cobaltate, lithium manganate, laminar lithium composite oxides based on α-NaFeO$_2$, etc. The anode generally comprises a current collector, and a negative-electrode active material layer formed on the current collector. The negative-electrode active materials can be, e.g., carbonaceous materials such as natural graphite, artificial graphite, cokes, carbon black, etc.

The electrolytic solutions can be obtained by dissolving lithium salts in organic solvents. The choice of solvent and/or lithium salt is not critical, and conventional solvents and salts can be used. The lithium salts can be, e.g., LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents can be organic solvents having relatively high boiling points (compared to the battery's shutdown temperature) and high dielectric constants. Suitable organic solvents include ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, and the like, including mixtures thereof. Because the organic solvents generally having high dielectric constants generally also have a high viscosity, and vice versa, mixtures of high- and low-viscosity solvents can be used.

When the battery is assembled, the separator is generally impregnated with the electrolytic solution, so that the separator (multi-layer, microporous membrane) is provided with ion permeability. The choice of impregnation method is not critical, and conventional impregnation methods can be used. For example, the impregnation treatment can be conducted by immersing the multi-layer, microporous membrane in an electrolytic solution at room temperature.

The method selected for assembling the battery is not critical, and conventional battery-assembly methods can be used. For example, when a cylindrical battery is assembled, a cathode sheet, a separator formed by the multi-layer, microporous membrane and an anode sheet are laminated in this order, and the resultant laminate is wound to a toroidal-type electrode assembly. A second separator might be needed to prevent short-circuiting of the toroidal windings. The resultant electrode assembly can be deposited into a battery can and then impregnated with the above electrolytic solution, and a battery lid acting as a cathode terminal provided with a safety valve can be caulked to the battery can via a gasket to produce a battery.

[7] Examples

The present invention will be explained in more detail referring to the following non-limiting examples.

Example 1

(1) Preparation of First Polyolefin Solution

A first polyolefin composition comprising (a) 82% of PE1 having a weight average molecular weight of $3.0 \times 10^5$ and a molecular weight distribution of 8.6, (b) 8% of PE2 having a weight average molecular weight of $2.0 \times 10^6$ and a molecular weight distribution of 8, (c) 10% of first polypropylene resin having a weight average molecular weight of $1.01 \times 10^6$, a heat of fusion of 108.2 J/g, a fraction having a molecular weight of $5 \times 10^4$ or less with the fraction being 4.3% and a molecular weight distribution of 4.3, the percentages being by weight of the first polyolefin composition, is prepared by dry-blending. The polyethylene resin in the composition has a melting point of 135° C. and a crystal dispersion temperature of 100° C.

Twenty-five parts by weight of the resultant first polyolefin composition is charged into a strong-blending double-screw extruder having an inner diameter of 58 mm and L/D of 42, and 75 parts by mass of liquid paraffin (50 cst at 40° C.) is supplied to the double-screw extruder via a side feeder. Melt-blending is conducted at 210° C. and 200 rpm to prepare a first polyolefin solution.

(2) Preparation of Second Polyolefin Solution

A second polyolefin solution is prepared in the same manner as above except as follows. A second polyolefin composition comprising (a) 47% of PE1 having a weight average molecular weight of $3.0 \times 10^5$ and a molecular weight distribution of 8.6, and (b) 3% of PE2 having a weight average molecular weight of $2.0 \times 10^6$ and a molecular weight distribution of 8, and (c) 50% of second polypropylene resin having a weight average molecular weight of $1.01 \times 10^6$, a heat of fusion of 108.2 J/g, a fraction having a molecular weight of $5 \times 10^4$ or less with the fraction being 4.3% and a molecular weight distribution of 4.3, percentages by weight of the second polyolefin composition, is prepared by dry-blending. The polyethylene resin in the composition has a melting point of 135° C. and a crystal dispersion temperature of 100° C. Thirty-five parts by weight of the resultant second polyolefin composition is charged into a strong-blending double-screw extruder having an inner diameter of 58 mm and L/D of 42, and 65 parts by mass of liquid paraffin (50 cst at 40° C.) is supplied to the double-screw extruder via a side feeder. Melt-blending is conducted at 210° C. and 200 rpm to prepare a second polyolefin solution.

(3) Production of Membrane

The first and second polyolefin solutions are supplied from their respective double-screw extruders to a three-layer-extruding T-die, and extruded therefrom to form an extrudate (also called a laminate) of first polyolefin solution layer/second polyolefin solution layer/first polyolefin solution layer at a layer thickness ratio of 42.5/10/42.5. The extrudate is cooled while passing through cooling rollers controlled at 20° C., to form a three-layer gel-like sheet, which is simultaneously biaxially stretched at 118° C. to a magnification of 5 fold in both machine (longitudinal) and transverse directions by a tenter-stretching machine. The stretched three-layer gel-like sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. The dried membrane is re-stretched by a batch-stretching machine to a magnification of 1.4 fold in a transverse direction at 125° C.

The re-stretched membrane, which remains fixed to the batch-stretching machine, is heat-set at 125° C. for 10 minutes to produce a three-layer microporous membrane.

Example 2

Example 1 is repeated except there is no re-stretching of the dried three-layer membrane.

Example 3

Example 1 is repeated except the first and second microporous polyolefin membranes is laminated in an order of first microporous membrane/second microporous membrane/first microporous membrane at a layer thickness ratio of 25/50/25.

Example 4

Example 1 is repeated except the first polypropylene resin in the first polyolefin composition has a weight average molecular weight of $6.6 \times 10^5$, a heat of fusion of 103.3 J/g, a fraction having a molecular weight of $5 \times 10^4$ or less with the fraction being 14.2% and a molecular weight distribution of 11.

Example 5

Example 1 is repeated except the first polypropylene resin in the first polyolefin composition has a weight average molecular weight of $6.8 \times 10^5$, a heat of fusion of 94.6 J/g, a fraction having a molecular weight of $5 \times 10^4$ or less with the fraction being 8.4% and a molecular weight distribution of 5.9.

Example 6

Example 1 is repeated except the first polypropylene resin in the first polyolefin composition has a weight average molecular weight of $3.0 \times 10^5$, a heat of fusion of 88.9 J/g, a fraction having a molecular weight of $5 \times 10^4$ or less with the fraction being 4.9% and a molecular weight distribution of 4.9.

Example 7

Example 1 is repeated except the second polypropylene resin in the second polyolefin composition has a weight average molecular weight of $1.82 \times 10^6$, a heat of fusion of 107.2 J/g, a fraction having a molecular weight of $5 \times 10^4$ or less with the fraction being 0.08% and a molecular weight distribution of 2.6.

Example 8

Example 1 is repeated except the second polypropylene resin in the second polyolefin composition has a weight average molecular weight of $0.90 \times 10^6$, a heat of fusion of 109.7 J/g, a fraction having a molecular weight of $5 \times 10^4$ or less with the fraction being 1.2% and a molecular weight distribution of 2.4.

Example 9

Example 1 is repeated except the first polyolefin composition of the first polyolefin solution comprises 90% of PE1 and 10% of first polypropylene resin, percentages by weight of the first polyolefin composition. There is no second polyethylene resin in this first polyolefin composition.

Example 10

Example 1 is repeated except the second polyolefin composition of the second polyolefin solution comprises 50% of PE1 and 50% of first polypropylene resin, percentages by weight of the first polyolefin composition. There is no second polyethylene resin in this second polyolefin composition.

Comparative Example 1

Example 1 is repeated except the first polyolefin composition of the first polyolefin solution comprises 82% first polyethylene resin and 18% second polyethylene resin, no added first polypropylene resin, percentages by weight of the first polyolefin composition,

Comparative Example 2

Example 1 is repeated except the first polyolefin composition of the first polyolefin solution. There is no first polyolefin composition.

Comparative Example 3

Comparative Example 1 is repeated except the first polypropylene resin in the first polyolefin composition has a weight average molecular weight of $6.8 \times 10^5$, a heat of fusion of 94.6 J/g, a fraction having a molecular weight of $5 \times 10^4$ or less with the fraction being 8.4% and a molecular weight distribution of 5.9, and the second polypropylene resin in the second polyolefin composition has a weight average molecular weight of $6.8 \times 10^5$, a heat of fusion of 94.6 J/g, a fraction having a molecular weight of $5 \times 10^4$ or less with the fraction being 8.4% and a molecular weight distribution of 5.9.

Comparative Example 4

Example 1 is repeated except the first polypropylene resin in the first polyolefin composition has a weight average molecular weight of $1.56 \times 10^6$, a heat of fusion of 78.4 J/g, a fraction having a molecular weight of $5 \times 10^4$ or less with the fraction being 1.2% and a molecular weight distribution of 3.2, and the second polypropylene resin in the second polyolefin composition has a weight average molecular weight of $1.56 \times 10^6$, a heat of fusion of 78.4 J/g, a fraction having a molecular weight of $5 \times 10^4$ or less with the fraction being 1.2% and a molecular weight distribution of 3.2.

Comparative Example 5

Comparative Example 1 is repeated except the second polyolefin composition of the second polyolefin solution. There is no second polyolefin composition.

Properties

The properties of the multi-layer microporous membranes of Examples 1-6 and Comparative Examples 1-8 are measured by the following methods. The results are shown in Tables 1 and 2.

(1) Average Thickness (μm)

The thickness of each microporous membrane is measured by a contact thickness meter at 10 mm intervals in the area of 10 cm×10 cm of the membrane, and averaged. The thickness meter used is a Litematic made by Mitsutoyo Corporation.

(2) Standard Deviation of Thickness (μm)

The thickness of each microporous membrane is measured as described above. The standard deviation of thickness is calculated based on the thickness data.

(3) Air Permeability (sec/100 cm³/20 μm)

Air permeability $P_1$ measured on each microporous membrane having a thickness $T_1$ according to JIS P8117 is converted to air permeability $P_2$ at a thickness of 20 μm by the equation of $P_2=(P_1 \times 20)/T_1$.

(4) Porosity (%)

Measured by a weight method using the formula: Porosity %=100×(w2−w1)/w2, wherein "w1" is the actual weight of film and "w2" is the assumed weight of 100% polyethylene.

(5) Pin Puncture Strength (mN/20 μm)

The maximum load is measured when each microporous membrane having a thickness of $T_1$ is pricked with a needle of 1 mm in diameter with a spherical end surface (radius R of curvature: 0.5 mm) at a speed of 2 mm/second. The measured maximum load $L_1$ is converted to the maximum load $L_2$ at a thickness of 20 μm by the equation of $L_2=(L_1 \times 20)/T_1$, and is used as pin puncture strength.

(6) Thickness Variation Ratio after Heat Compression (%)

A microporous membrane sample is situated between a pair of highly flat plates, and heat-compressed by a press machine under a pressure of 2.2 MPa (22 kgf/cm²) at 90° C. for 5 minutes, to determine an average thickness in the same manner as above. A thickness variation ratio is calculated by the formula of (average thickness after compression−average thickness before compression)/(average thickness before compression)×100, which can be expressed as an absolute value.

(7) Air Permeability after Heat Compression (sec/100 cm³)

Each multi-layer microporous membrane having a thickness of $T_1$ is heat-compressed under the above conditions, and measured with respect to air permeability $P_1$ according to JIS P8117.

(8) Electrolytic Solution Absorption Speed

Using a dynamic surface tension measuring apparatus (DCAT21 with high-precision electronic balance, available from Eiko Instruments Co., ltd.), a multi-layer microporous membrane sample is immersed in an electrolytic solution (electrolyte: 1 mol/L of $LiPF_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. The electrolytic solution absorption speed is expressed by a relative value, assuming that the electrolytic solution absorption rate in the microporous membrane of Comparative Example 5 is 1.

(9) Shut Down Temperature (° C.)

The shut down temperature is measured as follows: A rectangular sample of 3 mm×50 mm is cut out of the microporous membrane such that the longitudinal direction of the sample is aligned with the transverse direction of the microporous membrane, and set in a thermomechanical analyzer (TMA/SS6000 available from Seiko Instruments, Inc.) at a chuck distance of 10 mm. With a load of 19.6 mN applied to a lower end of the sample, the temperature is elevated at a rate of 5° C./minute to measure its size change. A temperature at a point of inflection observed near the melting point is defined as the shutdown temperature.

(10) Melt Down Temperature (° C.)

The melt down temperature is measured by using thermomechanical analyzer (TMA/SS6000 available from Seiko Instruments, Inc.) as well as the shut down temperature above. Melt down temperature is the temperature at which the membrane breaks.

(11) Capacity Recovery Ratio

The capacity recovery ratio of a lithium ion battery containing the multi-layer microporous membrane as a separator is measured as follows: First, the discharge capacity (initial capacity) of the lithium ion battery is measured by a charge/discharge tester before high temperature storage. After being stored at a temperature of 80° C. for 30 days, the discharge capacity is measured again by the same method to obtain the capacity after high temperature storage. The capacity recovery ratio (%) of the battery is determined by the following equation: Capacity recovery ratio (%)=[(capacity after high temperature storage)/(initial capacity)]×100.

TABLE 1

|  |  | No |  |  |  |  |  |
|---|---|---|---|---|---|---|---|
|  |  | Ex 1 | Ex 2 | Ex 3 | Ex 4 | Ex 5 | Ex 6 |
|  |  | Resin composition |  |  |  |  |  |
| First Polyolefin |  |  |  |  |  |  |  |
| PE1 | Mw | $3.0 \times 10^5$ | $3.0 \times 10^5$ | $3.0 \times 10^5$ | $3.0 \times 10^5$ | $3.0 \times 10^5$ | $3.0 \times 10^5$ |
|  | Mw/Mn | 8.6 | 8.6 | 8.6 | 8.6 | 8.6 | 8.6 |
|  | % by mass | 82 | 82 | 82 | 82 | 82 | 82 |
| PE2 | Mw | $2.0 \times 10^6$ | $2.0 \times 10^6$ | $2.0 \times 10^6$ | $2.0 \times 10^6$ | $2.0 \times 10^6$ | $2.0 \times 10^6$ |
|  | Mw/Mn | 8 | 8 | 8 | 8 | 8 | 8 |
|  | % by mass | 8 | 8 | 8 | 8 | 8 | 8 |
| 1st PP | Mw | $1.01 \times 10^6$ | $1.01 \times 10^6$ | $1.01 \times 10^6$ | $6.6 \times 10^5$ | $6.8 \times 10^5$ | $3.0 \times 10^5$ |
|  | Mw/Mn | 4.3 | 4.3 | 4.3 | 11 | 5.9 | 4.9 |
|  | LMWF[(1)] | 4.3 | 4.3 | 4.3 | 14.2 | 8.4 | 4.9 |
|  | Heat of fusion (J/g) | 108.2 | 108.2 | 108.2 | 103.3 | 94.6 | 88.9 |
|  | % by mass | 10 | 10 | 10 | 10 | 10 | 10 |
| Conc. of PO Comp. | % by mass | 25 | 25 | 25 | 25 | 25 | 25 |
| Second Polyolefin |  |  |  |  |  |  |  |
| PE1 | Mw | $3.0 \times 10^5$ | $3.0 \times 10^5$ | $3.0 \times 10^5$ | $3.0 \times 10^5$ | $3.0 \times 10^5$ | $3.0 \times 10^5$ |
|  | Mw/Mn | 8.6 | 8.6 | 8.6 | 8.6 | 8.6 | 8.6 |
|  | % by mass | 47 | 47 | 47 | 47 | 47 | 47 |
| PE2 | Mw | $2.0 \times 10^6$ | $2.0 \times 10^6$ | $2.0 \times 10^6$ | $2.0 \times 10^6$ | $2.0 \times 10^6$ | $2.0 \times 10^6$ |
|  | Mw/Mn | 8 | 8 | 8 | 8 | 8 | 8 |
|  | % by mass | 3 | 3 | 3 | 3 | 3 | 3 |

TABLE 1-continued

|  |  |  |  |  |  |  |  |
|---|---|---|---|---|---|---|---|
| $2^{nd}$ PP | Mw | $1.01 \times 10^6$ | $1.01 \times 10^6$ | $1.01 \times 10^6$ | $1.01 \times 10^6$ | $1.01 \times 10^6$ | $1.01 \times 10^6$ |
|  | Mw/Mn | 4.3 | 4.3 | 4.3 | 4.3 | 4.3 | 4.3 |
|  | LMWF[(1)] | 4.3 | 4.3 | 4.3 | 4.3 | 4.3 | 4.3 |
|  | Heat of fusion (J/g) | 108.2 | 108.2 | 108.2 | 108.2 | 108.2 | 108.2 |
|  | % by mass | 50 | 50 | 50 | 50 | 50 | 50 |
| Conc. of PO Comp. | % by mass | 35 | 35 | 35 | 35 | 35 | 35 |

Production condition

Extrudate

| | | | | | | | |
|---|---|---|---|---|---|---|---|
| Layer structure[(2)] | | (I)/(II)/(I) | (I)/(II)/(I) | (I)/(II)/(I) | (I)/(II)/(I) | (I)/(II)/(I) | (I)/(II)/(I) |
| Layer thickness ration | | 42.5/15/42.5 | 42.5/15/42.5 | 25/50/25 | 42.5/15/42.5 | 42.5/15/42.5 | 42.5/15/42.5 |

Stretching of Gel-Like sheet

| | | | | | | | |
|---|---|---|---|---|---|---|---|
| Temperature (° C.) | | 118 | 118 | 118 | 118 | 118 | 118 |
| Magnification (MD × TD)[(3)] | | 5 × 5 | 5 × 5 | 5 × 5 | 5 × 5 | 5 × 5 | 5 × 5 |

Stretching of dried membrane

| | | | | | | | |
|---|---|---|---|---|---|---|---|
| Temperature (° C.) | | 125 | — | 125 | 125 | 125 | 125 |
| Magnification (TD) | | 1.4 | — | 1.4 | 1.4 | 1.4 | 1.4 |

Heat setting treatment

| | | | | | | | |
|---|---|---|---|---|---|---|---|
| Temperature (° C.) | | 125 | 125 | 125 | 125 | 125 | 125 |
| Time (min) | | 10 | 10 | 10 | 10 | 10 | 10 |

Properties

| | | | | | | | |
|---|---|---|---|---|---|---|---|
| Average thickness (μm) | | 20.1 | 21.0 | 19.8 | 20.2 | 19.4 | 19.7 |
| STDEV of thickness (μm) | | 0.74 | 0.77 | 0.71 | 2.56 | 2.71 | 4.25 |
| Air Perm. (sec/100 cm³/20 μm) | | 165 | 258 | 448 | 145 | 153 | 140 |
| Porosity % | | 52.3 | 50.1 | 49.2 | 55.2 | 54.3 | 55.9 |
| Punct. Strength (mN/20 μm) | | 3280 | 3150 | 3080 | 3180 | 3120 | 3010 |
| Thick. Var. Aft. Heat Comp. % | | −8 | −14 | −9 | −10 | −10 | −12 |
| Air Perm. Aft. Heat Comp. | | 325 | 512 | 900 | 293 | 310 | 280 |
| Elec. Soln. Absorp. Speed | | 2.9 | 1.6 | 2.8 | 1.9 | 1.8 | 1.4 |
| Shut Down Temp. ° C. | | 135 | 135 | 135 | 135 | 135 | 135 |
| Melt Down Temp. ° C. | | 175 | 174 | 176 | 173 | 173 | 172 |
| Cap. Recovery Ratio % | | 78 | 76 | 77 | 76 | 75 | 70 |

| | | No | | | |
|---|---|---|---|---|---|
| | | Ex 7 | Ex 8 | Ex 9 | Ex 10 |

Resin composition

First Polyolefin

| | | | | | |
|---|---|---|---|---|---|
| PE1 | Mw | $3.0 \times 10^5$ | $3.0 \times 10^5$ | $3.0 \times 10^5$ | $3.0 \times 10^5$ |
|  | Mw/Mn | 8.6 | 8.6 | 8.6 | 8.6 |
|  | % by mass | 82 | 82 | 90 | 82 |
| PE2 | Mw | $2.0 \times 10^6$ | $2.0 \times 10^6$ | — | $2.0 \times 10^6$ |
|  | Mw/Mn | 8 | 8 | — | 8 |
|  | % by mass | 8 | 8 | — | 8 |
| PP | Mw | $1.01 \times 10^6$ | $1.01 \times 10^6$ | $1.01 \times 10^6$ | $6.6 \times 10^5$ |
|  | Mw/Mn | 4.3 | 4.3 | 4.3 | 11 |
|  | LMWF[(1)] | 4.3 | 4.3 | 4.3 | 14.2 |
|  | Heat of fusion (J/g) | 108.2 | 108.2 | 108.2 | 103.3 |
|  | % by mass | 10 | 10 | 10 | 10 |
| Conc. of PO Comp. | % by mass | 25 | 25 | 25 | 25 |

Second Polyolefin

| | | | | | |
|---|---|---|---|---|---|
| PE1 | Mw | $3.0 \times 10^5$ | $3.0 \times 10^5$ | $3.0 \times 10^5$ | $3.0 \times 10^5$ |
|  | Mw/Mn | 8.6 | 8.6 | 8.6 | 8.6 |
|  | % by mass | 47 | 47 | 47 | 50 |
| PE2 | Mw | $2.0 \times 10^6$ | $2.0 \times 10^6$ | $2.0 \times 10^6$ | — |
|  | Mw/Mn | 8 | 8 | 8 | — |
|  | % by mass | 3 | 3 | 3 | — |
| PP | Mw | $1.82 \times 10^6$ | $0.90 \times 10^6$ | $1.01 \times 10^6$ | $1.01 \times 10^6$ |
|  | Mw/Mn | 2.6 | 2.4 | 4.3 | 4.3 |
|  | LMWF[(1)] | 0.08 | 1.2 | 4.3 | 4.3 |
|  | Heat of fusion (J/g) | 107.2 | 109.7 | 108.2 | 108.2 |
|  | % by mass | 50 | 50 | 50 | 50 |
| Conc. of PO Comp. | % by mass | 35 | 35 | 35 | 35 |

TABLE 1-continued

| | | | | |
|---|---|---|---|---|
| Production condition | | | | |
| *Extrudate* | | | | |
| Layer structure[2] | (I)/(II)/(I) | (I)/(II)/(I) | (I)/(II)/(I) | (I)/(II)/(I) |
| Layer thickness ration | 42.5/15/42.5 | 42.5/15/42.5 | 25/50/25 | 42.5/15/42.5 |
| *Stretching of Gel-Like sheet* | | | | |
| Temperature (° C.) | 118 | 118 | 118 | 118 |
| Magnification (MD × TD)[3] | 5 × 5 | 5 × 5 | 5 × 5 | 5 × 5 |
| *Stretching of dried membrane* | | | | |
| Temperature (° C.) | 125 | 125 | 125 | 125 |
| Magnification (TD) | 1.4 | 1.4 | 1.4 | 1.4 |
| *Heat setting treatment* | | | | |
| Temperature (° C.) | 125 | 125 | 125 | 125 |
| Time (min) | 10 | 10 | 10 | 10 |
| Properties | | | | |
| Average thickness (μm) | 20.0 | 19.9 | 19.8 | 19.8 |
| STDEV of thickness (μm) | 0.74 | 0.70 | 0.59 | 0.73 |
| Air Perm. (sec/100 cm$^3$/20 μm) | 204 | 158 | 173 | 160 |
| Porosity % | 51.6 | 53.6 | 51.9 | 52.6 |
| Punct. Strength (mN/20 μm) | 3320 | 3200 | 3230 | 3300 |
| Thick. Var. Aft. Heat Comp. % | −7 | −11 | −12 | −10 |
| Air Perm. Aft. Heat Comp. | 410 | 315 | 346 | 321 |
| Elec. Soln. Absorp. Speed | 2.8 | 3.1 | 3.6 | 3.0 |
| Shut Down Temp. ° C. | 135 | 135 | 135 | 135 |
| Melt Down Temp. ° C. | 177 | 174 | 173 | 174 |
| Cap. Recovery Ratio % | 78 | 78 | 80 | 77 |

TABLE 2

| | | No | | | | |
|---|---|---|---|---|---|---|
| | | Comp. Ex 1 | Comp. Ex 2 | Comp. Ex 3 | Comp. Ex 4 | Comp. Ex 5 |
| Resin composition | | | | | | |
| *First Polyolefin* | | | | | | |
| PE1 | Mw | 3.0 × 10$^5$ | — | 3.0 × 10$^5$ | 3.0 × 10$^5$ | 3.0 × 10$^5$ |
| | Mw/Mn | 8.6 | — | 8.6 | 8.6 | 8.6 |
| | % by mass | 82 | — | 82 | 82 | 82 |
| PE2 | Mw | 2.0 × 10$^6$ | — | 2.0 × 10$^6$ | 2.0 × 10$^6$ | 2.0 × 10$^6$ |
| | Mw/Mn | 8 | — | 8 | 8 | 8 |
| | % by mass | 18 | — | 8 | 8 | 18 |
| PP | Mw | — | — | 6.8 × 10$^5$ | 1.56 × 10$^6$ | — |
| | Mw/Mn | — | — | 5.9 | 3.2 | — |
| | LMWF[1] | — | — | 8.4 | 1.2 | — |
| | Heat of fusion (J/g) | — | — | 94.6 | 78.4 | — |
| | % by mass | — | — | 10 | 10 | — |
| Conc. of PO Comp. | % by mass | 25 | — | 25 | 25 | 25 |
| *Second Polyolefin* | | | | | | |
| PE1 | Mw | 3.0 × 10$^5$ | 3.0 × 10$^5$ | 3.0 × 10$^5$ | 3.0 × 10$^5$ | — |
| | Mw/Mn | 8.6 | 8.6 | 8.6 | 8.6 | — |
| | % by mass | 47 | 47 | 47 | 47 | — |
| PE2 | Mw | 2.0 × 10$^6$ | 2.0 × 10$^6$ | 2.0 × 10$^6$ | 2.0 × 10$^6$ | — |
| | Mw/Mn | 8 | 8 | 8 | 8 | — |
| | % by mass | 3 | 3 | 3 | 3 | — |
| PP | Mw | 1.01 × 10$^6$ | 1.01 × 10$^6$ | 6.8 × 10$^5$ | 1.56 × 10$^6$ | — |
| | Mw/Mn | 4.3 | 4.3 | 5.9 | 3.2 | — |
| | LMWF[1] | 4.3 | 4.3 | 8.4 | 1.2 | — |
| | Heat of fusion (J/g) | 108.2 | 108.2 | 94.6 | 78.4 | — |
| | % by mass | 50 | 50 | 50 | 50 | — |
| Conc. of PO Comp. | % by mass | 35 | 35 | 35 | 35 | — |
| Production condition | | | | | | |
| *Extrudate* | | | | | | |
| Layer structure[2] | | (I)/(II)/(I) | (II) | (I)/(II)/(I) | (I)/(II)/(I) | (I) |
| Layer thickness ration | | 42.5/15/42.5 | 100 | 42.5/15/42.5 | 42.5/15/42.5 | 100 |
| *Stretching of Gel-Like sheet* | | | | | | |
| Temperature (° C.) | | 118 | 118 | 118 | 118 | 115 |
| Magnification (MD × TD)[3] | | 5 × 5 | 5 × 5 | 5 × 5 | 5 × 5 | 5 × 5 |

TABLE 2-continued

|  | No | | | | |
| --- | --- | --- | --- | --- | --- |
|  | Comp. Ex 1 | Comp. Ex 2 | Comp. Ex 3 | Comp. Ex 4 | Comp. Ex 5 |
| Stretching of dried membrane | | | | | |
| Temperature (° C.) | 125 | 125 | 125 | 125 | 125 |
| Magnification (TD) | 1.4 | 1.4 | 1.4 | 1.4 | 1.4 |
| Heat setting treatment | | | | | |
| Temperature (° C.) | 125 | 125 | 125 | 125 | 127 |
| Time (min) | 10 | 10 | 10 | 10 | 10 |
| Properties | | | | | |
| Average thickness (μm) | 20.0 | 20.3 | 19.2 | 19.9 | 20.3 |
| STDEV of thickness (μm) | 0.43 | 0.72 | 2.59 | 0.97 | 0.41 |
| Air Perm. (sec/100 cm$^3$/20 μm) | 270 | 410 | 110 | 610 | 370 |
| Porosity % | 49.1 | 47.2 | 57.9 | 55.2 | 39 |
| Punct. Strength (mN/20 μm) | 3260 | 3410 | 1830 | 1320 | 4410 |
| Thick. Var. Aft. Heat Comp. % | −20 | −10 | −15 | −17 | −21 |
| Air Perm. Aft. Heat Comp. | 630 | 820 | 220 | 1320 | 830 |
| Elec. Soln. Absorp. Speed | 1.3 | 2.4 | 2.6 | 1.8 | 1 |
| Shut Down Temp. ° C. | 135 | 135 | 135 | 135 | 135 |
| Melt Down Temp. ° C. | 174 | 176 | 163 | 162 | 148 |
| Cap. Recovery Ratio % | 67 | 82 | 74 | 76 | 65 |

Notes
[1]LMWF represents a low-molecular-weight fraction having a molecular weight of $5.0 \times 10^4$ or less (% by mass).
[2](I) represents the first polyolefin solution, and (II) represents the second polyolefin solution
[3](MD × TD) represents the magnification in a longitudinal direction (MD) and a transverse direction (TD).

It is noted from Table 1 that the multi-layer microporous membrane of the present invention has well-balanced properties, including standard deviation of thickness, air permeability, pin puncture strength, shut down temperature and melt down temperature, as well as excellent electrolytic solution absorption, with little variation of thickness and air permeability after heat compression. Lithium ion secondary batteries comprising the multi-layer microporous membranes of the present invention have capacity recovery ratios of 70% or more, indicating desirable high temperature retention properties.

On the other hand, the microporous membrane products of the Comparative Examples exhibit a poorer balance of properties.

The multi-layer microporous membrane of the present invention has well-balanced properties and use of such multi-layer microporous membrane as a battery separator provides batteries having excellent safety, heat resistance, retention properties and productivity.

What is claimed is:

1. A three-layer microporous membrane, comprising:
a first microporous layer containing a first layer material, a third microporous layer containing the first layer material, and a second microporous layer containing a second layer material, the second microporous layer being located between the first and third microporous layers,
wherein the first layer material comprises a first polyethylene and a first polypropylene and the second layer material comprises a second polyethylene and a second polypropylene, the second polypropylene having (1) a weight-average molecular weight of $6 \times 10^5$ or more, (2) a heat of fusion of 90 J/g or more, and (3) a fraction having a molecular weight of $5 \times 10^4$ or less with the fraction being 5% or less by mass of the second polypropylene, and
the first polyethylene is present in the first layer material in a first polyethylene amount in the range of from about 50 wt. % to about 99 wt. % based on the weight of the first layer material,
the first polypropylene is present in the first layer material in a first polypropylene amount in the range of from about 1 wt. % to about 50 wt. % based on the weight of the first layer material,
the second polyethylene is present in the second layer material in a second polyethylene amount in the range of from about 5 wt. % to about 95 wt. % based on the weight of the second layer material, and
the second polypropylene is present in the second layer material in a second polypropylene amount in the range of from about 5 wt. % to about 95 wt. % based on the weight of the second layer material.

2. The three-layer microporous membrane of claim 1, wherein the multi-layer microporous membrane comprises a first microporous layer containing the first microporous layer material and a second microporous layer containing the second microporous layer material.

3. The three-layer microporous membrane of claim 1, comprising:
a first microporous layer containing the second layer material, a third microporous layer containing the second layer material, and a second microporous layer containing the first layer material, the second microporous layer being located between the first and third microporous layers.

4. The three-layer microporous membrane of claim 1 wherein
(a) the first and/or second polyethylene comprises a polyethylene having an Mw ranging from about $1 \times 10^4$ to about $5 \times 10^5$, a polyethylene having an Mw of at least about $1 \times 10^6$, or both a polyethylene having an Mw ranging from about $1 \times 10^4$ to about $5 \times 10^5$ and a polyethylene having an Mw of at least about $1 \times 10^6$, wherein
(1) the first and/or second polyethylene has an Mw in the range of about $1 \times 10^4$ to about $1 \times 10^7$;
(2) the first and/or second polyethylene has an Mw ranging from about $1 \times 10^4$ to about $5 \times 10^5$;
(3) the polyethylene having an Mw ranging from about $1 \times 10^4$ to about $5 \times 10^5$ is one or more of a high-density polyethylene, a medium-density polyethylene, a branched low-density polyethylene, or a linear low-density polyethylene;

(4) the polyethylene having an Mw ranging from about $1\times10^4$ to about $5\times10^5$ is at least one of (i) an ethylene homopolymer or (ii) a copolymer of ethylene and a third α-olefin selected from the group of propylene, butene-1, hexene-1;

(5) the polyethylene having an Mw of at least $1\times10^6$ has an Mw of at least about $1\times10^6$;

(6) the polyethylene having an Mw of at least $1\times10^6$ is at least one of (i) an ethylene homopolymer or (ii) a copolymer of ethylene and a fourth α-olefin selected from the group of propylene, butene-1, hexene-1;

(7) the amount of the polyethylene having an Mw ranging from about $1\times10^4$ to about $5\times10^5$ in the first microporous layer material is in the range of from about 70 wt. % to about 90 wt. %, based on the weight of the first microporous layer material;

(8) the amount of the polyethylene having an Mw of at least about $1\times10^6$ in the first microporous layer material is in the range of from about 0 wt. % to about 10 wt. %, based on the weight of the first microporous layer material;

(9) the amount of the polyethylene having an Mw ranging from about $1\times10^4$ to about $5\times10^5$ in the second microporous layer material is in the range of from about 40 wt. % to about 60 wt. %, based on the weight of the second microporous layer material;

(10) the amount of the polyethylene having an Mw of at least about $1\times10^6$ in the second microporous layer material is in the range of from about 0 wt. % to about 10 wt. %, based on the weight of the second microporous layer material;

(11) the first and/or second polyethylene has a molecular weight distribution ("Mw/Mn") of about 5 to about 300;

(b) the first polypropylene has at least one characteristic selected from:

(1) the first polypropylene is one or more of (i) a propylene homopolymer or (ii) a copolymer of propylene and a fifth olefins selected from one or more of α-olefins such as ethylene, butene-1, pentene-1, hexene-1, 4-methyl-pentene-1, octene-1, vinyl acetate, methyl methacrylate, styrene, butadiene, 1,5-hexadiene, 1,7-octadiene and 1,9-decadiene;

(2) the first polypropylene has an Mw ranging from about $1\times10^4$ to about $4\times10^6$;

(3) the first polypropylene has an Mw/Mn ranging from about 1.01 to about 100;

(4) the first polypropylene is isotactic;

(5) the first polypropylene has a heat of fusion of at least about 90 Joules/gram;

(6) The first polypropylene has a melting peak (second melt) of at least about 160° C.; and (c) the second polypropylene has at least one characteristic selected from:

(1) an Mw/Mn of 2.5 or less;

(2) a weight-average molecular weight of $6.5\times10^5$ or more;

(3) a heat of fusion of 95 J/g or more, and (4) the fraction of the second polypropylene having a molecular weight of $5\times10^4$ or less being 4.5% or less by mass of the second polypropylene.

5. The three-layer microporous membrane of claim 1, wherein the first and/or second polyethylene has an Mw in the range of about $2\times10^5$ to about $3\times10^6$.

6. The three-layer microporous membrane of claim 1, wherein the first and/or second polyethylene has a weight-average molecular weight in the range of $1\times10^4$ to $5\times10^5$.

7. The three-layer microporous membrane of claim 4, wherein the polyethylene having an Mw ranging from about $1\times10^4$ to about $5\times10^5$ is high-density polyethylene and the polyethylene having an Mw of at least about $1\times10^6$ is ultra-high molecular weight polyethylene.

8. The three-layer microporous membrane of claim 4, wherein the first and/or second polyethylene comprises 10 wt. % or less of the polyethylene having an Mw of at least about $1\times10^6$ and 90 wt. % or more of the polyethylene having an Mw ranging from about $1\times10^4$ to about $5\times10^5$.

9. A battery comprising an anode, a cathode, an electrolyte, and the multi-layer microporous membrane of claim 1, wherein the multi-layer microporous membrane of claim 1 separates at least the anode from the cathode.

10. The battery of claim 9, wherein the electrolyte contains lithium ions and the battery is a secondary battery.

11. The battery of claim 9, wherein the multi-layer membrane has a porosity of 25 to 80%, an air permeability of 20 to 700 seconds/100 cc (converted to the value at 20-μm thickness), a pin puncture strength of 2,000 mN/20 μm or more, a shut down temperature of 120 to 140° C., a meltdown temperature of 170° C. or higher, and a battery capacity recovery ratio of 70% or higher.

12. The battery of claim 9 used as a source or sink of electric charge.

* * * * *